June 26, 1951  E. W. ECKEY  2,558,548
POLYVINYL ESTER-ESTER INTERCHANGE PROCESS
Filed June 20, 1950
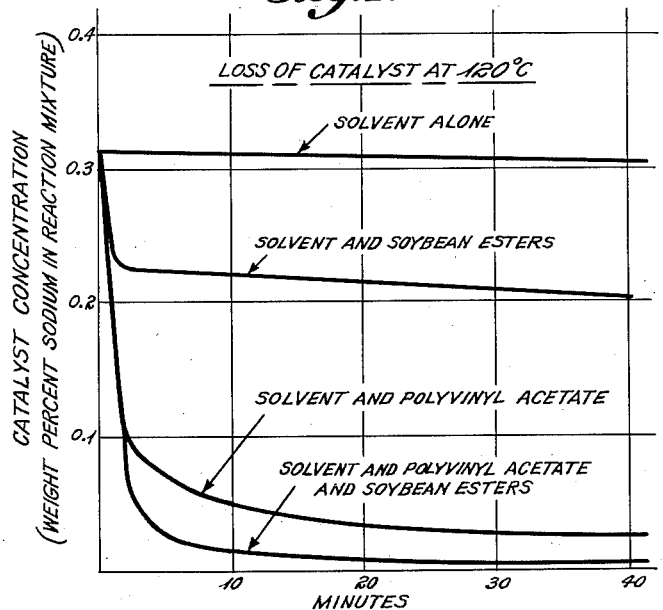
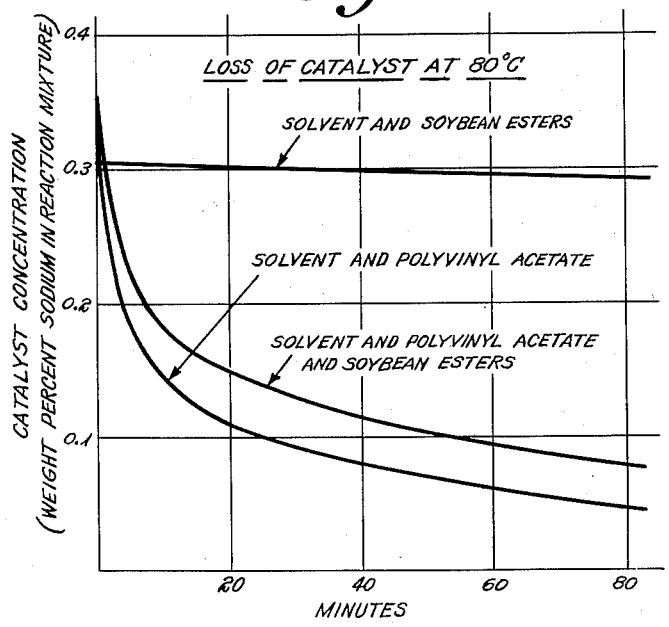
INVENTOR
Eddy W. Eckey
BY Burns Doane & Benedict
ATTORNEYS

UNITED STATES PATENT OFFICE 2,558,548

POLYVINYL ESTER-ESTER INTERCHANGE PROCESS

Eddy W. Eckey, Wyoming, Ohio

Application June 20, 1950, Serial No. 169,170

43 Claims. (Cl. 260—410.6)

This invention relates to polyvinyl esters and to a process for the production thereof. More particularly, the invention embraces an ester-ester interchange process for the production of polyvinyl esters and the products thereby obtained.

In the past, various processes have been proposed for the production of polyvinyl esters of acids such as the higher molecular weight fatty acids. One such procedure entails the direct esterification of polyvinyl alcohol in a melt. Inasmuch as monomeric vinyl alcohol has not been isolated and cannot be polymerized directly, this process is undesirable in that it entails as an initial step the preparation of the polyvinyl alcohol starting material from a pre-formed polyvinyl ester. The use of the melt procedure, necessitated by the relative mutual insolubility of the polyvinyl alcohol and the high molecular weight acids, is also undesirable and renders the process commercially infeasible.

An alternative prior art procedure for the production of polyvinyl esters entails as a first step the preparation of the appropriate monomeric vinyl ester, for example, by the reaction of the appropriate acid with acetylene, followed by subsequent polymerization to produce the desired polyvinyl ester. This method is necessarily restricted in its application, since the presence of small amounts of the radicals of unsaturated acids such as linoleic or linolenic acid interferes with the polymerization of the vinyl groups to effect a substantial reduction in the yeld and molecular weight of the polymer formed. Moreover, the process is not commercially practical in a generic sense because reaction conditions requisite to effective polymerization differ with respect to each particular monomeric vinyl ester employed.

It is the primary object of this invention to provide a commercially feasible ester-ester interchange process for the production of polyvinyl esters of any desired organic acid. It is a further object of this invention to provide for the first time many heretofore unknown polyvinyl esters which are attended by unique and unexpected properties of great value.

It has now been discovered that polyvinyl esters may be produced by reacting at a temperature not greater than about 120° C. in the presence of a solvent and a catalyst for the reaction, an initial polyvinyl ester and a primary alcohol ester of an organic acid different from the acid from which the initial polyvinyl ester is derived.

It is critical and essential to the production of polyvinyl esters by ester-ester interchange that the reaction be effected at a temperature not greater than about 120° C. If this upper temperature limit is exceeded, the reaction does not proceed to any appreciable extent. A preferred temperature range for the process of this invention is from about 40° C. to about 100° C. A highly suitable range is from 40° C. to 80° C. Temperatures below about 40° C., although operable, are normally undesirable because of the resulting decrease in reaction rate. Below 10° C. the reaction is too slow to be significant.

The critical significance of the upper temperature limit of 120° C. is graphically illustrated in Figures 1 and 2, the curves of which are based on the data appearing in Tables I and II. These data together with Figures 1 and 2 demonstrate that polyvinyl esters have an outstanding propensity to destroy the ester-ester interchange catalyst and in this respect differ in kind from fluid, monomeric esters previously employed in ester-ester interchange reactions. These data further demonstrate that this catalyst destroying propensity is aggravated by high temperatures and that conventional relationships for chemical reaction rates are not applicable to the polyvinyl ester-ester interchange reaction of this invention.

As defined in detail hereinafter, the catalyst added to the material appears to react with the other ingredients of the reaction mixture to form unknown compositions which exert the true catalytic action. Hence, while the amount of catalyst used may be predicated upon the total weight of one or all of the ingredients of the reaction mixture after addition of the catalyst, the proper measure of the catalytic activity is determinable by the extent of the effect of the catalys on the reaction mixture. For example, when alkaline catalysts such as those used in these tests are employed, the alkalinity of the reaction mixture after the addition of the catalysts is a true measure of the residual catalytic activity.

The data set forth in Tables I and II were obtained from two series of tests. In one such series of tests the reaction mixtures were maintained at 80° C. and in the other the reaction mixtures were maintained at 120° C. Tables I and II represent the composition of the reaction mixtures employed in these tests. Each series of tests embraced experiments determinative of the extent of catalyst consumption at the time intervals indicated in Tables III and IV, by (1) a solution of distilled methyl esters of soybean fatty acids, (2) a solution of polyvinyl acetate, (3) a mixed solution of polyvinyl acetate and distilled methyl esters of soybean fatty acids. The experiments conducted at 120° C. also included a control test with the solvent diethoxy ethane alone.

The reactions were carried out in a 3-necked flask, equipped with a motor-driven stirrer, a tube leading to a point near the bottom of the flask, for adding catalyst and for withdrawing samples, a thermometer, a fractionating column connected to a vacuum pump and a nitrogen supply. After the ingredients, except catalyst, were put into the flask, the air in the system was replaced by nitrogen. The mix was then heated with an oil-bath, and a small quantity of diethoxy ethane was distilled off through the fractionating column at reduced pressure to insure complete dryness of the reaction flask and its contents. The pressure was then brought back to one atmosphere by admission of nitrogen to the system, the contents of the flask were brought to the desired temperature and catalyst solution was added.

The catalyst solution, which consisted of sodium dissolved in a mixture of diethoxy ethane and naphthalene at room temperature, was prepared in another flask similarly equipped to exclude air. Transfer of the catalyst solution was made by withdrawing it from the flask in which it was prepared, by means of a volumetric glass syringe, from which it was expelled into the reaction flask. In this way, practically no contact of the catalyst solution with air occurred during the transfer.

Samples for titration were withdrawn from the reaction flask in the same way. Titrations were made as follows: A 5 ml. sample was drawn from the reaction flask and immediately placed in an Erlenmeyer flask containing a measured quantity of a mixture of glacial acetic acid and benzene. Fifty milliliters of neutral alcohol was added, to the resulting mixture, and to another flask containing the same quantity of acetic acid and benzene to serve as a blank. Titrations were made with 0.1 N aqueous sodium hydroxide solution, with thymol blue as indicator. The alkali in the sample uses up part of the glacial acetic acid to form sodium acetate; whereas the benzene prevents precipitation of polyvinyl acetate. The remaining free acetic acid is titrated. The difference between the blank titration and the sample titration represents the alkali present in the sample when it was taken.

Approximately the same proportion of catalyst based on the weight of the entire reaction mixture was used in all the experiments. The compositions of the reaction mixtures, after the addition of catalyst, are given in Tables I and II. The ratio of solvent to ester was somewhat higher in the 80° C. tests than in the higher temperature tests, to insure that the reaction mix would be homogeneous.

TABLE I

[Tests at 120° C.]

| Sample No | I | II | III | IV |
|---|---|---|---|---|
| Polyvinyl acetate (gms.) | | | 16.0 | 16.0 |
| Polyvinyl acetate (eq.) | | | 0.182 | 0.182 |
| Soybean methyl esters (gms.) | | 52.5 | | 52.5 |
| Soybean methyl esters (eq.) | | 0.182 | | 0.182 |
| Diethoxy ethane, (gms.) | 60.4 | 66.0 | 62.3 | 70.4 |
| Diethoxy ethane (moles) | 0.51 | 0.56 | 0.53 | 0.60 |
| Naphthalene (gms.) | 1.2 | 2.1 | 1.4 | 2.4 |
| Sodium [1] (gms.) | 0.193 | 0.344 | 0.244 | 0.406 |
| Sodium (eq.) | 0.0084 | 0.015 | 0.011 | 0.018 |
| Sodium, weight percent of mix | 0.312 | 0.285 | 0.305 | 0.287 |
| Sodium (eq./eq. of total ester) | | 0.083 | 0.061 | 0.05 |

[1] Calculated on the basis of a sample of the catalyst solution. The sodium and naphthalene were introduced with the catalyst solution.

TABLE II

[Tests at 80° C.]

| Sample No | V | VI | VII |
|---|---|---|---|
| Polyvinyl acetate (gms.) | | 7.5 | 16.0 |
| Polyvinyl acetate (eq.) | | 0.085 | 0.182 |
| Soybean methyl esters (gms.) | 34.8 | | 52.5 |
| Soybean methyl esters (eq.) | 0.121 | | 0.182 |
| Diethoxy ethane (gms.) | 41.9 | 38.8 | 97.3 |
| Diethoxy ethane (moles) | 0.35 | 0.33 | 0.82 |
| Naphthalene (gms.) | 1.4 | 0.9 | 3.1 |
| Sodium [1] (gms.) | 0.236 | 0.148 | 0.512 |
| Sodium (eq.) | 0.010 | 0.0064 | 0.022 |
| Sodium, weight percent of mix | 0.302 | 0.312 | 0.302 |
| Sodium (eq./eq. of total ester) | 0.083 | 0.075 | 0.061 |

[1] Calculated on the basis of a sample of the catalyst solution. The sodium and naphthalene were introduced with the catalyst solution.

The results are given in Tables III and IV and Figure 1. Loss of catalyst caused by the solvent alone was negligible. With the solution of soybean methyl esters, at 120° C., there was a slight initial loss of catalyst, followed by a very slow further loss. At 80° C., the results were similar, except that the initial loss did not seem to occur.

In contrast, the solutions containing polyvinyl acetate lost a much greater proportion of catalyst. At 120° C. this loss was so rapid that in the mix containing polyvinyl acetate and soybean methyl esters, ester-ester interchange failed to occur to a degree sufficient to make the polyvinyl ester soluble in petroleum ether. At 80° C., although the loss of catalyst was rapid, ester-ester interchange took place.

TABLE III

*Alkalinity remaining after time indicated at 120° C.*

| | Minutes | Solvent Only | Solvent and Soybean Esters | Solvent and Polyvinyl Acetate | Solvent, Soybean Esters and Polyvinyl Acet. |
|---|---|---|---|---|---|
| Catalyst added [1] | 0 | 0.312 | 0.285 | 0.305 | 0.287 |
| | 1 | 0.312 | 0.230 | 0.101 | 0.093 |
| Catalyst remaining | 5 | 0.309 | 0.226 | 0.050 | 0.028 |
| | 10 | 0.306 | 0.222 | 0.053 | 0.025 |
| | 20 | 0.306 | 0.220 | 0.041 | 0.008 |
| | 30 | 0.309 | 0.212 | 0.022 | 0.007 |

[1] Weight percent of sodium in entire mix.

TABLE IV

*Alkalinity remaining at time indicated at 80° C.*

| | Minutes | Solvent and Soybean esters | Solvent and Polyvinyl Acetate | Solvent and Soybean Esters and Polyvinyl acetate |
|---|---|---|---|---|
| Catalyst added (Weight percent of entire mix) | 0 | 0.302 | 0.312 | 0.302 |
| | 1 | 0.313 | 0.350 | [1] 0.287 |
| | 5 | 0.301 | 0.179 | 0.225 |
| | 20 | 0.278 | 0.106 | [2] 0.154 |
| | 40 | [3] 0.287 | 0.079 | [5] 0.133 |
| | 70 | [4] 0.276 | 0.069 | [6] 0.098 |

[1] After 1.5 minutes.
[2] After 19 minutes.
[3] After 41 minutes.
[4] After 68 minutes.
[5] After 34 minutes.
[6] After 76 minutes.

As a consequence of the aforementioned propensity of the polyvinyl esters to undergo side reactions and of the inherent relative slowness of the interchange reaction rate of the polyvinyl esters, a proper choice of factors favorable to the reaction should be made to insure obtaining the desired product in high yield. The most significant of these factors are, (1) the requirement that the ester which is reacted with the polyvinyl ester be derived from a primary alcohol and the nature of the primary alcohol radical of such ester, (2) the nature of the reaction medium or solvent, and (3) the nature of the catalyst employed. Generally speaking, proper selection of one of these factors is adequate to insure a commercially practical operation. Other factors which are of significance include the viscosity of the polyvinyl ester employed, the pressure under which the reaction is effected, and the presence of impurities such as acids, peroxides, and other materials which tend to destroy the catalyst.

THE CATALYST

The ester-ester interchange reaction of this invention requires a catalyst. Generally speaking, the conventional ester-ester interchange catalysts such as the alkali metal alcoholates and other conventional catalysts may be employed. The invention accordingly embraces generically the use of ester-ester interchange catalysts as a class in its broadest aspects.

In some instances, it is particularly desirable to use a catalyst which is more effective then these conventional catalysts. One aspect of this invention embraces the utilization as catalysts a series of compounds which have not previously been employed in ester-ester interchange reactions.

It has been discovered that the organo-alkali compounds in which an alkali metal is joined directly to a carbon atom of an organic compound are particularly useful as catalysts in the process of the invention. Among the organo-alkali compounds which may be employed are included the sodium, lithium, and potassium derivatives of triphenyl methyl, benzene, and the like. There are innumerable other compounds of this type, all of which are operable in this invention. The sodium compounds are preferred for economic reasons and for the reason that they are more easily prepared.

A particularly convenient catalyst of the organo-alkali type may be prepared by dissolving sodium or other appropriate alkali metal in a mixture of a polycyclic aromatic hydrocarbon such as naphthalene, and an ether, in the manner described in United States Patent No. 2,183,847. Polycyclic hydrocarbons other than naphthalene which may be used include anthracene, phenathrene, pyrene, and certain related compounds such as diphenylene oxide. Acenaphthalene, fluorene, and carbazole are less suitable. In addition to the ethers disclosed in United States Patent No. 2,183,847, it has been discovered that tetrahydrofuran, tetrahydrofurfuryl methyl ether, methyl tetrahydrofuran and dimethoxy tetrahydrofuran are especially suitable.

When metallic sodium or other alkali metal is stirred with a mixture of a polycyclic aromatic hydrocarbon and an ether, an intensely dark green solution is formed. Such a solution when added to a mixture of esters forms an excellent ester-ester interchange catalyst. The green color disappears upon addition of the solution to the ester-ester interchange reaction mixture with visible evidence of the decomposition of the organo-alkali compound. These organo-alkali compounds accordingly do not themselves function as the ester-ester interchange catalyst, but tend immediately to metalate the ester reactants and thereby to be decomposed. The addition of an organo-alkali compound to an ester-ester interchange reaction mixture therefore comprises in effect the formation of an ester-ester interchange catalyst in situ. The organo-alkali metal compounds described in Patents 2,019,832; 2,027,000; 2,054,303; 2,171,867; 2,171,868; and 2,183,847 may also be used.

The alkali metal hydrides, i. e., lithium, sodium and potassium hydrides constitute an additional class of alkali metal compounds which function particularly well as ester-ester interchange catalysts. Sodium hydride is preferred because of its cheapness and availability. The alkali metal hydrides are preferably utilized in the form of a suspension which can be formed by grinding the hydride in an inert organic liquid. These alkali metal hydrides and probably also the alkali metal alcoholates function as ester-ester interchange catalysts in a manner similar to the organo-alkali compounds, i. e., they react with the ester-ester interchange reactants to form the true catalytic material. In the case of hydrides, this metalation reaction is evidenced by the evolution of hydrogen as the hydride gradually dissolves in the reaction mixture.

Likewise the finely divided alkali metals per se may be employed as catalysts with excellent results. Finely divided lithium, sodium and potassium may be so employed. Sodium is again preferred for economic reasons. These finely divided alkali metal catalysts are also preferably employed in the form of a suspension in an inert hydrocarbon.

The quantity of catalysts may be varied over a wide range. As previously mentioned, the quantity of catalysts which may be added to the reaction mixture may be determined on the basis of one or all of the reactants, preferably the polyvinyl ester reactant.

A preferred quantity of alkaline catalysts is an amount which will provide from about 1 to about 2 parts of alkali metal per 100 parts of polyvinyl ester reactant. An amount of catalyst which will provide less than about 0.5 part of alkali metal per 100 parts of polyvinyl ester reactant is generally speaking the minimum practical quantity. The catalysts may be added either in one batch at the initiation of the reaction or in increments during the course thereof. As pointed out hereinbefore, after the addition of the catalysts, the true measure of the catalytic effect is properly determinable in terms of the effect of the catalyst on the reaction mixture. When the preferred alkaline catalysts are used, it is desirable that the alkalinity of the reaction mixture remain sufficiently intense to give an alkaline reaction with thymol blue indicator. An alkalinity insufficient to change thymol blue from yellow to a greenish color when a sample of the reaction mix is mixed with twice its volume of neutral alcohol containing the indicator is generally impractical and denotes that the alkaline catalyst has been substantially completely dissipated.

THE ALCOHOL RADICAL OF THE NON-POLYVINYL ESTER REACTANT

It has been discovered that the rate of the polyvinyl ester-ester interchange reaction is in part a function of the nature of the alcohol radical of the non-polyvinyl ester reactant. Only primary alcohol esters satisfactorily enter into ester-ester interchange with polyvinyl esters. This phenomenon is unique to the polyvinyl ester-ester interchange reaction and is a consequence of the chemical nature of the polyvinyl esters, which insofar as this invention is concerned, are critically different from conventional monomeric esters.

Furthermore, the nature of the alcohol radical of the primary alcohol ester reactant is of major significance.

The preferred primary alcohol esters are those which contain the grouping:

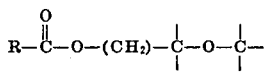

in which

is the acyl radical of an acid; in which the undesignated linkages of the beta carbon atom are satisfied by hydrogen, alkyl or aryl groups, in which the oxygen atom joined to the beta carbon atom is derived from an ether or an ester group, and in which the remaining unsatisfied valences can be satisfied by any organic radical. These esters may be cyclic or acyclic, saturated or unsaturated, straight or branched chain, substituted or unsubstituted. Exemplary are the fatty acid esters of ethylene and propylene glycol; ethylene and propylene glycol mono ethers such as ethylene glycol mono methyl ether and ethylene-glycol mono phenyl ether; glycerol, furfuryl alcohol or tetrahydrofurfuryl alcohol; acetone glycerol; methylene glycerol; and various other alcohols. Halogen, nitro and similar substituted derivatives of these esters may be employed. Esters of this type enter into the ester-ester interchange with polyvinyl esters at a rate of 5 or more times as great as the corresponding saturated primary alcohol esters such as the methyl, ethyl, propyl, hexyl, octyl, and homologous alcohols. The unusual reactivity of these esters is believed attributable primarily to the plurality of ester and ether linkages, which may serve as loci for the formation of catalyst-reactant complexes which favor the reaction.

In this respect, it is pointed out that homologous ether esters in which an ether linkage is attached to the carbon atom alpha to the acyl group such as methoxy methyl acetate and ethylidine diacetate are extremely reactive and may tend to consume an undesirable quantity of catalyst.

Similarly, those ether esters or polyesters in which the significant oxygenated groups are separated by more than two carbon atoms are highly suitable, although such compounds demonstrate somewhat less reactivity than the beta ether esters and beta diesters. Exemplary of such compounds are methoxy propyl acetate and ethoxy butyl propionate.

It will be appreciated from the foregoing that the preferred primary alcohol esters can be substituted either in the alcohol or the acid radical by any desired substituent. Exemplary are halogen substituents, the various hydrocarbon and substituted hydrocarbon substituents, carbonyl substituents, ether substituents, and the like.

The simple monohydric primary alcohol esters are likewise particularly appropriate starting materials for reaction with polyvinyl esters. Such esters include methyl, ethyl, propyl, hexyl, octyl, dodecyl, and homologous esters and also the branched chain isomers and unsaturated counterparts thereof. These esters also may be substituted in either the alcohol or acid radical. Hence, halogenated derivatives, nitro derivatives and the like are suitable. Additional primary alcohol esters which fall into the class include those which have aryl or cyclic substituents such as the beta phenyl ethyl alcohol esters, and the esters of cyclohexyl methanol. The methyl and ethyl esters are ordinarily the most desirable of this series for economic reasons. Furthermore, the by-product esters derived therefrom are volatile and easily removed from the ester-ester interchange reaction medium.

It has further been discovered that the remarkable reactivity of the aforementioned primary alcohol radicals may indirectly be availed of through the use as reaction promoters of low molecular weight mono- or polyorganic acid esters of the appropriate alcohols. Such reaction promoters, which preferably embrace low molecular weight organic, preferably fatty acid esters of alcohols containing at least one primary hydroxyl group, include for example the acetates, propionates, butyrates, and homologous esters of saturated monohydric alcohols such as methyl, ethyl, propyl, butyl, amyl, hexyl octyl, dodecyl alcohols and of the branched chain isomers and unsaturated analogs thereof, of the dihydric alcohols such as ethylene and diethylene glycol, propylene glycol, the various isomeric hexylene glycols, of the higher polyhydric alcohols such as glycerol and pentaerythritol, and of sugar alcohols and the anhydro derivatives thereof including the hexitols, hexitans, and hexides.

As in the case of the non-polyvinyl ester reacted directly with polyvinyl esters, those reaction promoters are preferred which contain the grouping:

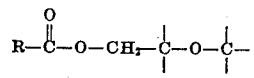

When employed as promoters, however, it is preferred that the acyl group

be derived from a low molecular weight acid. Exemplary of such compounds are ethylene glycol monomethyl ether acetate, diethylene glycol monomethyl ether acetate, and the like.

Similarly, the simple straight chain fatty acid esters of primary straight chain alcohols are the next most preferred promoters. Such compounds include for example ethyl acetate, methyl acetate, methyl propionate, and ethyl butyrate. Unsaturated aliphatic alcohol esters such as allyl acetate, pentenyl propionate, and the like are also suitable.

The primary alcohol esters are preferred for use as promoters for the ester-ester interchange reaction. Secondary alcohol esters such as the isopropyl or isobutyl esters of the low molecular weight acids serve also to favor the reaction when employed as reaction media as a consequence of the ester linkage. This aspect is discussed in detail hereinafter.

The promoter esters of the aforementioned type undergo reaction as the ester-ester interchange proceeds. It appears that ester-ester interchange first occurs between the promoter esters and the non-polyvinyl ester reactants, thus forming, in situ, an ester of the type specified hereinbefore as preferred for direct reaction with polyvinyl esters. Inasmuch as the promoter esters enter into the ester-ester interchange reaction, it is preferable that the acid radical of the polyvinyl ester starting material and the promoter ester be the same, whereby undue complexity of the reaction mixture and attendant difficulties in the isolation of the desired product may be avoided.

In some instances, it is advantageous to employ a mixture of promoters. A useful combination which has been employed comprises a triglyceride such as triacetin and a lower fatty acid ester of a saturated aliphatic primary alcohol such as methyl acetate. It has been found highly advantageous for example in effecting ester-ester interchange between polyvinyl acetate and linseed fatty acid esters to utilize a combination of methyl acetate and a small proportion of triacetin as a promoter. Mixtures of esters of monohydric and dihydric alcohols and of different monohydric or polyhydric alcohols also comprise suitable combinations of promoters.

The amount of promoter utilized in the ester-ester interchange process of the invention may be widely varied. In many instances, an amount sufficient merely to initiate the reaction is sufficient. Particularly is this true when the byproduct ester formed is of a type capable of functioning as a promoter. A highly desirable quantity of promoter is from about ⅕ to about 10 molecular equivalents of promoter per equivalent of non-polyvinyl ester reactant. Preferably, from about ¼ to about 3 molecular equivalents of promoter per equivalent of non-polyvinyl ester reactant is employed. In instances such as those described hereinafter where the promoter serves also as mutual solvent, large relative amounts thereof may be desirable.

THE NATURE OF THE REACTION MEDIUM

A further factor of significance to the successful production of polyvinyl esters by ester-ester interchange is the nature of the reaction medium. Preferably, a homogeneous or substantially homogeneous reaction system is utilized. It will be appreciated by those skilled in the art, however, that effective contact between the reactants may be achieved, although the system remains substantially heterogeneous in nature. The invention embraces operation under such conditions.

In some instances, for example, when relatively low molecular weight esters are reacted with low viscosity polyvinyl esters, the physical properties of the reactants may be such that the requisite contact may result without the use of a mutual solvent. In general, however, a suitable mutual solvent is preferably present at the initiation of the reaction in a quantity sufficient either to render the mixture essentially homogeneous or at least to soften the reactants and bring them into intimate contact. It will be understood that the condition of homogeneity or intimate contact between the reactants is alone not sufficient to assure successful reaction. A favorable choice of solvent and the utilization of an appropriate proportion thereof however, favors the reaction and contributes to the success thereof.

The ester-type reaction promoters discussed hereinbefore comprise one class of materials which may be employed as solvents for the ester-ester interchange reactants. In this respect, it is pointed out that low molecular weight fatty acid esters of secondary alcohols and tertiary alcohols may be employed as reaction media although these materials may not function as promoters in the same manner as do the primary alcohol ester promoters discussed hereinbefore. Thus, such materials as isopropyl acetate and tertiary butyl propionate may be utilized as solvents or reaction media. As previously mentioned, these promoters are in some instances objectionable as reaction media in that they enter into the reaction and tend to contaminate the product. This objection however does not obtain to an appreciable degree when the secondary and tertiary alcohol esters are employed.

One aspect of this invention embraces the utilization in the ester-ester interchange reaction of certain other solvents which do not enter into the ester-ester interchange reaction except insofar as they may form transitory intermediates or complexes with the reacting esters and catalysts.

Generically speaking, these particular solvents embrace those materials which apart from forming transitory catalyst-reactant complexes are essentially inert under the reaction conditions and which contain an unshared electron pair which may serve as loci for complex formation. Exemplary of such compounds are amines, carbonyl compounds, sulfides, ethers and the like.

The primary and secondary amines tend to form by-products containing amide linkages, by reaction with esters; similarly, the carbonyl compounds have some tendency to form condensation products during the reaction. These side reactions may be minimized by using the minimum catalyst and time necessary for the desired degree of ester interchange. These complications do not occur with the ethers which accordingly are the preferred complex-forming compounds.

The term ethers is employed herein in its true generic sense and to embrace all organic compounds which contain the —C—O—C— linkage although some of these ether compounds may commonly be designated by names other than ether. Compounds such as acetals, formals, ketals, lactones, and the like may be employed.

It will be understood that it is the ether linkage which is of significance. Exemplary of ethers which can be employed are the simple and mixed, straight and branched chain, acyclic and cyclic, substituted and unsubstituted, saturated and unsaturated, mono and poly, aromatic and aliphatic ethers. Illustrative of such compounds are di-n butyl ether, isobutyl hexyl ether, propyl-butyl ether, dioxane, tetrahydrofuran, anisole, phenetol, benzyl ether, polyglycols such as triethylene glycol and unsaturated analogs and homologs of these compounds. It will be appreciated that the foregoing listing of specific compounds is illustrative only and that ethers generically are operable in and embraced by this invention. The same facts are true of the various other organic compounds containing unshared electron pairs including the ketones and amines.

It will be appreciated that certain of these ethers, such as ethyl ether, which are of low molecular weight may prove to be relatively poor solvents for certain of the reactants. These ethers may be utilized in conjunction with an inert solvent such as toluene or the like. When so employed, the primary function of the ethers is analogous to that of the preferred promoter esters, that is, to provide loci for the formation of transitory complexes and thus to promote the reaction.

Certain of the ethers may contain negative substituents which detract somewhat from their effectiveness. Thus, dibenzyl ether is not as effective as aromatic ethers in which the aryl group is at least as far removed from the ether linkage as the beta carbon atom. Those skilled in the art will of course appreciate that these are questions of degree and choice of a suitable ether to effect a promotion of a desired ester-ester interchange reaction is dependent upon these inherent differences in the nature and reactivity of the ether linkage in the various compounds contemplated.

The most preferred ethers for use as reaction media in the ester-ester interchange reaction of this invention include dioxane, tetrahydrofuran, 2-methyltetrahydrofuran, tetrahydrofurfuryl methyl ether, dimethoxyethane, diethoxyethane, diethylene glycol diethyl ether, methylal, ethylene glycol methyl ether acetal, anisole, phenetol, and dimethoxy tetraethylene glycol.

Inert hydrocarbons such as benzene, toluene, xylene, petroleum naphtha, and the like, also act as mutual solvents for many polyvinyl esters and other organic esters which may be employed as reactants. These inert solvents may be utilized when other factors are favorable.

REACTION CONTROL AND REACTION CONDITIONS

A particular advantage of the process of the present invention resides in the flexibility of control over the extent of replacement of the ester groups of the initial polyvinyl ester whereby an extremely wide and diversified variety of products may be obtained. The reaction involved is essentially a reversible methathetical reaction which results in the production of a by-product ester. The degree of reaction accordingly may be controlled by partially or completely removing from the reaction mixture during the course of the reaction the by-product ester formed, thus displacing the equilibrium and causing the reaction to proceed to any desired degree. Thus, the degree of replacement of the ester groups of the original polyvinyl ester reactant may be controlled throughout wide limits.

When the ester-ester interchange reactants utilized are such that volatile by-product esters are formed, a preferred method for control of the extent of the ester-ester interchange reaction entails the maintenance of temperature and pressure conditions during the reaction such that the by-product ester will be caused to distill out of the reaction mixture. This expedient may be availed of for example with extremely volatile by-product esters such as methyl acetate or with much less volatile esters such as methoxy ethyl acetate or hexyl propionate.

Useful results can also be obtained, however, without removal of the by-product esters from the reaction mixture. When this expedient is adopted, a portion of the non-polyvinyl ester reactant as well as the by-product ester remains in the reaction mixture at the termination of the reaction and may be removed by conventional methods such as distillation or liquid-liquid extraction. This mode of operation is preferred when the by-product esters produced by a particular ester-ester interchange reaction are characterized by a vapor pressure which is so low that the esters will not readily distill out of the reaction mixture, at temperatures and pressures suitable for the ester-ester interchange reaction. For example, when a direct reaction between triglycerides or other high molecular polyhydric alcohol esters with polyvinyl esters is effected, this mode of operation is desirable.

The degree of extent of the ester-ester interchange reaction may also be controlled by a proper choice of proportions of reactants. The reaction of polyvinyl acetate with another ester in an amount substantially less than that stoichiometrically equivalent to the polyvinyl ester will result in the replacement of only a fraction of the acid radicals of the polyvinyl ester starting material. Similarly, an amount of non-polyvinyl ester reactant substantially in excess of the stoichiometric amount may be utilized when substantially complete replacement of the ester groups of the polyvinyl ester starting material is desired. When such an expedient is availed of, the excess of the non-polyvinyl ester reactant may be removed by conventional methods and employed in a subsequent reaction.

The pressure or pressures employed during the reaction can be widely varied. Inasmuch as the pressure utilized in conjunction with the temperatures affords a means for the control of the rate and extent of the ester-ester interchange reaction, it will frequently be desirable that it be manipulated throughout a wide range of values not only with respect to different reactants but also at various stages of any particular reaction. In initial stages of the ester-ester interchange reaction the pressure is appropriately maintained at any value adequately high to prevent loss of the mutual solvent or promoter at the temperatures employed. After the reaction has been initiated, the pressure may be reduced to cause distillation of the by-product ester formed, and near the end of the reaction to near zero. Thus, the pressure initially may be atmospheric or higher than atmospheric for example, about five atmospheres, whereas at the end of the reaction the pressure conventionally will be below about 1 atmosphere, preferably from about 0.1 atmosphere to about 0.001 atmosphere. If it is desired however to preclude the loss of any of the by-product ester formed or of the reaction media, the pressure may be held constant or even maintained throughout the reaction somewhat higher than atmospheric. If it is desired to remove a portion of the by-product ester, it may be removed without pressure change by raising the temperature.

Agitation of the reaction mixture is advantageous particularly when the reaction results in a pronounced increase in the viscosity of the reaction mixture. Efficient stirring is a preferred means of agitation. Shaking or the passage of an inert gas through the mixture, or other expedients known to the art may also be employed.

The order of mixing the ingredients is of little significance in determining whether or not the reaction will take place. It is of course desirable to utilize ingredients free from moisture, acids, peroxides, and similar compounds which tend to dissipate the catalyst or give rise to undesirable by-products. It is also desirable to exclude air and moisture from the reaction mixture. The catalyst may be added batch-wise to the mixture of all of the other reactants or alternatively the catalyst may be mixed with the non-polyvinyl ester reactants prior to combination of these materials with the polyvinyl ester. Likewise, in some instances it may be advantageous to add the catalyst in increments during the course of the reaction rather than batch-wise at the beginning thereof.

A preferred practical sequence of steps for the production of polyvinyl esters of high molecular weight fatty acids such as those present in the natural oils entails first the production of methyl esters of the fatty acids of the oil by methanolysis. This reaction is easy to carry out and reaches a high degree of completion. A preferred promoter such as methoxy ethyl acetate is added to the methyl esters and this mixture is in turn added to the polyvinyl ester which has previously been dissolved in an appropriate solvent. If desired, the polyvinyl ester may have been made in situ in the solvent utilized and not isolated as such. The by-product ester is recovered and recycled as desired to the reaction mixture to maintain a desirable quantity of promoter present.

The product so formed is purified at the end of the reaction by extraction with a solvent such as ethyl alcohol, acetone or a methyl acetate-ethyl alcohol mixture which is a relatively poor solvent for the product but is a good solvent for the other components of the reaction mixture. Separation is effected by decantation after settling. A high degree of purification is achieved by this extraction process which is far superior to conventional filtering operations. It has further been discovered that the color of the product may be improved by heating to a temperature of about 150° C. to 250° C. at the termination of the reaction for a period of from about one-fourth of an hour to about four hours.

THE PRIMARY REACTANTS AND PRODUCTS

The process of this invention embraces generically all polyvinyl esters of carboxylic acids with respect to both reactants and products. Thus, there may be employed as starting materials polyvinyl esters of all organic carboxylic acids as well as similar esters of copolymers of polyvinyl alcohol with such other monomeric materials as allyl acetate, methoxy ethyl vinyl ether and the like. Polyvinyl acetate is the preferred starting material.

The invention is likewise generic as to starting materials with respect to the viscosity or molecular weight of the polyvinyl esters employed. Those polyvinyl esters which have a viscosity falling within the usual commercial range may be utilized as well as polyvinyl esters which have higher or lower viscosities or molecular weights than such currently commercially available products. It will be appreciated that the reaction products obtained from the use of the polyvinyl esters of varying molecular weight will similarly vary with respect to physical properties.

It is apparent from the foregoing that the polyvinyl esters which are embraced by this invention as both reactants and products may be represented by the formula:

$$(CH_2CHA)_n$$

wherein $CH_2CH$ is a polymerized vinyl group, A is an organic acid radical, and $n$ is an integer greater than 1. In the foregoing formula, A can represent the same or different acid radicals which may be derived from monobasic, polybasic, saturated or unsaturated, substituted or unsubstituted, straight or branched chain, cyclic or acyclic, alkyl, aryl, or alkaryl, acid. Exemplary of the alkyl monocarboxylic acids are the saturated fatty acids such as acetic, propionic, 2-methyl hexanoic, lauric, isododecanoic, stearic, and the like. Unsaturated analogs of these acids are similarly operable. Polybasic acids such as phthalic, succinic, maleic, cyclohexadiene dicarboxylic, and similar acids, aromatic monobasic acids such as benzoic and naphthoic, and alkaryl acids such as phenyl acetic and 2-ethyl benzoic are also operable. "A" can also represent substituted alkyl and aryl acids such as chloro benzoic, 3-amino benzoic, nitrobenzoic, and cyclic acids such as furoic.

It is apparent from the foregoing that the non-polyvinyl ester reactants operable in this invention embrace generically the primary alcohol esters of all organic carboxylic acids. Such esters accordingly may be represented by the formula RA in which R is any primary alcohol radical and A has the same significance as that ascribed to it in the foregoing formula for the polyvinyl esters.

Of particular interest as products of the invention are the polyvinyl esters which are derived by ester-ester interchange from the various natural oils, particularly the drying and semi-drying oils. The polyvinyl esters of the acids of the drying and semi-drying oil acids dry much more rapidly and form more durable films than the analogous triglyceride oils. This difference is so marked that polyvinyl esters derived from non-drying oils and fats such as lard, white grease, olive oil and partially hydrogenated fish oils demonstrate drying properties which are definitely superior to those of many natural drying and semi-drying oils.

Of particular interest is the fact that polyvinyl esters may be produced by this invention which contain any desired ratio of solid to liquid fatty acid radicals in the ester molecule. A plurality of materials having highly desirable properties may be produced in this way. For example, polyvinyl esters derived from a mixture of inedible lard acids and linseed oil acids constitute a product which is characterized by outstanding drying properties and which is not attended by the adverse effect of an excessive amount of saturated acid radicals which typifies many natural oils. Hence it is possible through the medium of this invention to convert naturally occurring oils which in their normal state are of little value to commercially significant compositions.

Exemplary of the drying oils which may be employed in the process of this invention as starting materials are linseed, China-wood (tung), poppy seed, safflower seed, oiticica, and candlenut oils, etc. Semi-drying oils such as soybean, Brazil nut, corn, cottonseed, croton, rapeseed, sesame and sunflower oils, and mixtures of drying and semi-drying oils may be utilized. Also non-drying oils may be employed such as cashew nut oil, castor oil, olive oil, palm kernel oil, and coconut oil. These latter are advantageously used in admixture with drying oils to produce synthetic drying oils constituting polyvinyl mixed esters of drying and non-drying oil fatty acids.

Marine oils, such as menhaden and sardine oils, are also suitable as drying oils for preparation of polyvinyl esters of the invention. There may also be mentioned processed oils such as partially hydrogenated vegetable and marine oils, for example partially hydrogenated soybean and cottonseed oils, or partially hydrogenated menhaden and sardine oils as semi-drying oils. Also winterized oils, such as winterized menhaden or sardine oils are included in the category of drying oils with the corresponding unprocessed oils.

When oils are the source of the replacing fatty acid radicals the lower molecular weight saturated aliphatic alcohol esters of the fatty acids are advantageously prepared by alcoholysis of the triglycerides in the oils with the selected alcohol and the resulting esters are recovered from the glycerol, and, if necessary, from partial glycerides formed if alcoholysis is not complete.

Also included within the scope of the invention is the synthesis of polyvinyl mixed esters of drying and semi-drying oil fatty acids with fatty acid radicals of other than drying and semi-drying oil acids as constituents. For example, polyvinyl mixed esters of soybean oil-methacrylic acids, linseed oil-acrylic acids, linseed oil-coconut oil acids, China-wood oil-cottonseed oil acids, etc. Such mixed esters have remarkable properties, in most cases being capable of ready polymerization to form clear hard films, and exhibiting surprising drying properties. The esters containing China-wood oil acids, however, resemble the natural oils in their tendency to form frosted films.

Where drying properties are not desired various fats whose glycerides contain a large proportion of oleic, palmitic and stearic acid radicals may be the source of the fatty acid esters, or fractionated oil esters, or the esters of isolated fatty acids, both saturated and unsaturated may be employed.

The lower saturated aliphatic alcohol esters of the fatty acids which are applicable in the process include those derived from such alcohols as methyl, ethyl, n-propyl, isopropyl, butyl, and amyl alcohols, including the various isomers of the two last named alcohols. In addition, alkoxy alcohols, such as methoxy ethyl, ethoxy methyl, and lower molecular weight homologous alcohols may be employed. In some instances the naturally occurring triglyceryl esters of the fatty acids may be used as reactants.

The methyl and ethyl esters of the fatty acids are preferred based upon consideration of cost and availability, the former being particularly advantageous, since the methyl ester by-product formed with the lower fatty acid radical of the polyvinyl ester is more volatile and, therefore, more readily removed from the reaction mixture during the reaction. In the preferred embodiment polyvinyl acetate and methyl esters of the selected fatty acids are used to give methyl acetate as the by-product ester. For example, when utilizing linseed oil as the source for the fatty acid esters, the linseed oil may be subjected to methanolysis to produce the methyl esters of linseed oil fatty acids. When these esters are reacted with polyvinyl acetate, methyl acetate is removed as the by-product ester.

In those instances where mixed polyvinyl esters of drying, semi-drying and non-drying oils, fatty acids and fatty acids other than those derived from oils, such as acrylic, methacrylic, etc. are synthesized by the ester interchange process, the fatty acid components of the oils may be present as triglycerides (glyceryl esters) rather than, for example, as methyl esters. As an illustration, a synthetic drying oil may be prepared by reacting polyvinyl acetate, methyl methacrylate and soybean oil in the presence of methyl acetate. The resulting product is a mixed polyvinyl ester of methacrylic and soybean oil fatty acids together with glyceryl esters of the same acids. Where ester interchange is incomplete the mixed ester product also contains acetate groups. Mixtures of the oils (triglycerides) and lower aliphatic alcohol esters of the fatty acids may be employed as reactants.

The invention is more fully illustrated by the following examples, which describe the preferred embodiments of the invention and are not to be construed as a limitation thereof:

EXAMPLE I

*(Polyvinyl coconut oil fatty acid esters)*
*(Cellosolve acetate promoter and solvent)*

A charge consisting of 37.5 grams of polyvinyl acetate, (Bakelite Corporation Grade AYAC, saponification number 583), 75 grams of coconut oil methyl esters (saponification number 256), and 25 grams of Cellosolve acetate was placed in a suitable reaction vessel. The charge was then heated for 1 hour at 100° C. to remove moisture. The resulting mixture was clear but separated into two liquid phases when cooled.

Twelve and five-tenths grams of ethylene glycol ethylether acetate and 1.0 g. sodium methoxide were then added to the reaction mixture. The resulting mix was then heated gradually to 95° C. with continuous stirring over a period of 40 minutes, at a pressure of 75 to 120 mm. During this time, 2½ ml. of distillate were collected. This distillate consisted of methyl acetate, indicating ester interchange was occurring.

The vacuum was broken, and to the reaction mix at 52° C., was added 1.1 ml. of a suspension of sodium hydride finely ground in heptane, containing 0.33 g. NaH per ml. The pressure was reduced and the mixture gradually was heated to 99° C. The mixture darkened when this addition of catalyst was made. There was much foaming at first, due to evolution of hydrogen, from the sodium hydride. About five minutes after the hydride had been added the mixture started to give off distillate. Heating was continued at a pressure of about 100–110 mm. and temperature of 80° to 85° and the distillate amounted to about 22½ ml.

The vacuum was again broken, and the mixture allowed to cool. The distillate was found to boil at 57° C., and to have a specific gravity of 0.93, indicating it was methyl acetate.

To the cooled mix were added an additional 50 g. of coconut methyl ester and an additional 0.6 ml. of sodium hydride suspension. The mix was heated over a period of 26 minutes to a maximum temperature of 118° C., pressure about 120 mm. The distillate from this stage of the reaction amounted to 12 ml.

The vacuum was broken with nitrogen and 5 ml. of glacial acetic acid were added to neutralize the catalyst. The color lightened considerably when the acetic acid was added, to give a red colored product.

The product in the reaction flask (165.5 g.) was washed into a separatory funnel with 400 ml. of petroleum ether and washed with five separate portions of water to remove the sodium acetate formed upon neutralization of the catalyst. The petroleum ether was distilled off, and the product was dried by heating to a temperature of 125° C., with pressure reduced to 100 mm. and a slow stream of $CO_2$ passing through the product, in a flask surrounded by an oil bath.

The material was then heated under high vacuum to distill out esters of the ethylene glycol ethylether and any unreacted methyl esters. This operation was effected at a pressure of about 1 mm. and maximum temperature of 200° C. By this operation a light colored distillate amounting to 43.7% of the material was removed.

The product comprising the residue was a reddish yellow viscous oil, soluble in petroleum ether and in benzene, and insoluble in ethyl alcohol. The product resembles sorghum molasses in color and viscosity and has a saponification number of 263. Viscosity of a 10% solution in benzene at 40° C. was 1.74 centistokes in comparison with 1.36 centistokes for a 10% solution of polyvinyl acetate, AYAC, under the same conditions. The product was a polyvinyl ester of coconut oil fatty acids.

The saponification number of the product, in comparison with the saponification numbers of the coconut methyl esters and the polyvinyl acetate used, shows that at least 91% of the acetate groups in the polyvinyl acetate were replaced by the coconut oil fatty acid groups.

The characteristics indicate that the polyvinyl esters of long chain fatty acids are soluble in petroleum ether, and much softer at room temperature than the polyvinyl acetate from which they are made. Nevertheless, the viscosity in solution in benzene is greater.

EXAMPLE II

*Polyvinyl pelargonate (nonanoate)*

Methyl pelargonate was chosen as a reactant because it is a good solvent for polyvinyl acetate, so that no other material is needed to form a homogeneous reaction mixture.

A mixture of 15 grams polyvinyl acetate (AYAC) and 30 grams methyl pelargonate was heated in a reaction vessel for 30 min. at 100 mm. pressure to remove any moisture. The vacuum was broken with nitrogen. The mixture was a homogeneous liquid. With the mix at 50° C., 1 ml. of a suspension containing 0.28 g. NaH was added. The pressure was reduced to about 15 to 20 mm. and the mixture was heated for 1 hour, with continued stirring, and with the temperature gradually raised to 94° C. The mixture had a turbid, milky appearance, gradually turning somewhat orange. Distillate amounted to only 1.5 ml., consisting mainly of the hexane introduced with the catalyst.

The vacuum was broken with nitrogen and an additional 0.4 ml. of catalyst suspension was added. A further half-hour of heating under vacuum to 97° produced only 0.6 ml. of additional distillate.

The vacuum was again broken and 2 ml. of ethylene glycol ethylether acetate (Cellosolve acetate) was added with the mix at 58°. The mix frothed and darkened in color, but gave not much additional distillate during another ½ hours gradual heating to 90°.

At this point, a mixture of 0.3 ml. of sodium hydride suspension and 2½ ml. Cellosolve acetate was added to the reaction mix. The mix was heated with the pressure held at about 80 mm. The color turned to a darker brown, and distillate began coming over at a faster rate. In 15 minutes, with the temperature gradually raised to 105° C., the distillate amounted to 11¼ ml. of methyl acetate. The heating and stirring were then stopped, the vacuum broken as before, and 2 ml. glacial acetic acid was added to the flask. When the acid penetrated the reaction mix it lightened the color to a reddish orange.

The product when removed from the flask was found to be a rubbery material, resembling raw rubber except that it was softer and much weaker than rubber. It could not be dissolved in ethyl ether, petroleum ether, alcohol, acetone. In toluene it swelled greatly, but did not dissolve. Its saponification number corresponded closely to the calculated saponification number for polyvinyl pelargonate.

EXAMPLE III

*Polyvinyl esters of linseed oil fatty acids (methyl acetate promoter and solvent)*

In a suitable reaction vessel, a mixture of linseed oil methyl esters, 12 g. and dry methyl acetate, 6 g. was warmed to 40° C. To this was added 1 ml. of a suspension of sodium hydride in hexane containing 0.28 g. NaH per ml. With stirring, the mix was heated for 30 minutes at 1 atm. pressure, 40–60° C.

In a separate flask, a mix of 12 g. methyl acetate 10 g. polyvinyl acetate, AYAC, and 19 g. of linseed methyl esters was prepared.

The two mixtures were combined and heated for 20 min. at 1 atm. pressure, at 65–70°. 2½ ml. distillate accumulated.

An additional 0.5 ml. of catalyst was added.

The mix was then heated at 1 atm. to 80° C. for a period of 20 min. At this point, the reaction mix was nearly clear and dark brown, and about 8 ml. of distillate had collected.

Over the next 20 minutes, the pressure was gradually reduced to 60 mm. while the temperature was raised to 97° C. Distillate increased to 18 ml.

Over the next 20 min. the temperature was held at about 97° by a boiling water bath, and pressure was reduced to about 15 mm. Distillate amounted to 19 mm.

At this stage the mix was cooled to 79°, and the vacuum was broken with $N_2$. An additional catalyst consisting of 1 g. sodium methoxide mixed with 3 ml. methyl acetate was added. The mix was heated 30 minutes with temperature gradually raised and pressure gradually reduced to about 15 mm. Toward the end, the water bath was removed and the mixture directly heated until the mix reached a temperature of 111° C. The mix was then acidulated with 3 ml. glacial acetic acid. Distillate from reaction: 22.8 g.

The reaction product consisting of 38.7 g. was washed with water after dissolution in hexane. After removal of solvent and moisture the product was heated to 220° C. at 1 mm. pressure to distill out any unreacted methyl esters.

Twenty-four and two-tenths grams of polyvinyl linseed esters were obtained as a product. These esters are a viscous oil, somewhat turbid, dark colored at first but gradually lightening on standing to a light brownish color. The saponification number of the product was 220.

EXAMPLE IV

*Polyvinyl ester of linseed oil fatty acids (triacetin and methyl acetate promoters and solvents)*

| Materials: | | Quantity |
|---|---|---|
| Polyvinyl acetate | g | 7.3 |
| Methyl esters of linseed oil | g | 30.2 |
| Triacetin | g | 3.0 |
| Methyl acetate (anhydrous) | g | 14.7 |
| Sodium hydride (suspension of NaH ground in hexane, containing 0.28 g. NaH per ml.) | ml | 1.5 |

*Procedure.*—The polyvinyl acetate (Bakelite AYAC) was dissolved in four-fifths of the methyl acetate, then three-fifths of the linseed methyl esters (prepared by methanolysis of linseed oil) were added. This mixture was boiled under a reflux condenser to get it homogeneous, then cooled to 60° C.

In a reaction flask, the triacetin and the balance of both the linseed methyl esters and the methyl acetate were mixed and warmed to 40° C. To this was added 1.0 ml. of the catalyst suspension, after which the mix was heated and stirred for 15 minutes, 40 to 60° C., one atmosphere pressure. The mix became brown and almost clear.

The first mixture, containing the polyvinyl acetate, was added to the reaction flask and the whole was heated and stirred for 30 minutes at one atmosphere, 60 to 70° C. It was then cooled to 60° C., and 0.5 ml. additional of catalyst suspension was added. Immediate frothing ensued. The mixture was heated further for 15 min. at one atmosphere at 60 to 81° C. The mixture during this period became dark red and somewhat viscous. Distillate amounted to 2 ml.

The pressure was gradually reduced to about 17 mm. while the mixture was heated to 95° C. over a period of 17 minutes. Distillate amounted to 11.5 ml. The heating was continued for 30 minutes more, at the same pressure, and with the reaction flask surrounded with boiling water. The vacuum was then broken by admission of nitrogen to the flask, and the catalyst in the reaction mix was destroyed by the addition of 2.1 ml. of glacial acetic acid. Distillate from the reaction amounted to 12.4 g.

*Treatment of the reaction product.*—The contents of the reaction flask were taken up in 100 ml. hexane, transferred to a separatory funnel and washed four times with water in 75 ml. portions. The water separated readily after being shaken with the hexane solution; the hexane solution became milky, orange colored. The solvent was then removed from the solution by distillation from a flask heated with an oil-bath, with a final pressure of about 20 mm. and temperature of 130° C.

The dark red liquid product was then heated at a lower pressure (1 mm.) to a higher temperature (230° C.) to distill out any unreacted methyl esters. Practically no distillate was obtained, showing that almost no free methyl ester was present. The product consisting of polyvinyl esters of linseed oil fatty acids and linseed oil was a light brown viscous oil. Saponification number 178. Viscosity of a 10% solution in benzene 1.49 centistokes.

The low saponification number of the product indicated almost complete replacement of acetate groups. The absence of free methyl esters as indicated by the distillation test also indicated a high completeness of the ester interchange.

EXAMPLE V

*Polyvinyl esters of soybean oil fatty acids*

A reaction was run with polyvinyl acetate, AYAC and the methyl esters of soybean oil, by the method of Example III, except that sodium methoxide instead of sodium hydride was used as catalyst.

The polyvinyl soybean ester product, after removal of unreacted methyl esters by extraction with alcohol followed by distillation under vacuum was a clear, viscous, light colored oil, soluble in ethyl ether. The product had an acid number of 1.9, a saponification number of 246, an iodine number of 116, and a viscosity of 2.01 centistokes in a 10% solution in benzene.

EXAMPLE VI

*Polyvinyl esters of linseed oil fatty acids (methyl acetate promoter and solvent)*

This preparation was conducted by the method of Example III, except that (1) all of the ingredients, except catalyst were in the reaction flask together before the catalyst was added, (2) a larger ratio of polyvinyl acetate to methyl esters was used to give about 30% excess of acetate groups over the quantity equivalent to the methyl esters, (3) a longer time of reaction was allowed.

An excess of polyvinyl acetate was used in order to favor complete reaction of the methyl esters.

Materials: | Quantity
---|---
Polyvinyl acetate, AYAC | g__ 9.4
Linseed methyl esters | g__ 22.5
Methyl acetate, dried | g__ 18.0
Sodium hydride suspension | ml__ 1.5

*Procedure.*—The polyvinyl acetate was powdered, and was dissolved in the methyl acetate in a reaction vessel. The linseed esters were then added and the whole mix was heated to 50° C. by means of a water-bath surrounding the vessel. A small portion, 0.1 ml., of the sodium hydride suspension was added, and the mix was stirred for 24 minutes at one atmosphere pressure, 50-60° C. The mix became turbid and straw-colored. It was cooled at 50° and 0.3 ml. of catalyst suspension was added. This caused the mix to froth up momentarily. The mix was again heated and stirred for 30 minutes at one atmosphere and a temperature of 54 to 67° C. It became orange-colored and turbid. The mix was allowed to cool again at 54°, 0.5 ml. catalyst was added, and mix was heated, with stirring for one hour, 54 to 79°, 1 atm. The mix became dark brown and homogeneous. Distillate collected amounted to 6.7 ml.

The mix was again cooled to 52° C. and 0.6 ml. catalyst was added. No frothing occurred. The temperature was raised to 90° C. and the pressure was reduced gradually. Over a two hour period, the temperature was raised to 98° C. and the pressure was reduced to about 15 mm.

At the end of this time, the reaction mixture was dark brown and very viscous. The vacuum was broken by admission of nitrogen and the catalyst was neutralized by addition of 2 ml. glacial acetic acid to the mix. Thirty and nine-tenths grams of product were obtained.

*Treatment of reaction product.*—The product was taken up in hexane solvent and washed several times with water. After removal of the solvent, the washed product was heated to 220° C. in a distilling flask, at about 2 mm. pressure to remove any unreacted methyl esters.

Distillate amounted to 25.3% of the sum of distillate and undistilled residue. The product, a mixed polyvinyl ester of linseed oil fatty acids and acetic acid, was a light brown viscous oil. Saponification number, 289. Iodine number, 135. Viscosity of 10% solution in benzene, 40° C., 2.42 cks.

The saponification number indicated that a fairly large proportion of acetate groups were retained in the product. This is due to the fact that the methyl esters used were less than the quantity equivalent to the acetate, and that not all the methyl esters reacted. In spite of this, the product was a homogeneous oil, with drying properties much superior to linseed oil.

EXAMPLE VII

*Mixed polyvinyl esters*

This example illustrates the preparation of mixed polyvinyl esters having a relatively low iodine number. A proportion of polyvinyl acetate to esters other than acetate was taken such that the product would retain a substantial proportion of acetate groups.

Materials: | Quantity, grams
---|---
Polyvinyl acetate, AYAC | 10.1
Linseed methyl esters | 15
Coconut methyl esters | 7
Methyl Cellosolve acetate | 3
Methyl acetate, dried | 12.1
Sodium hydride suspension | .36

*Procedure.*—The ingredients except methyl acetate, polyvinyl acetate and catalyst were put into a reaction flask. A solution of polyvinyl acetate in methyl acetate was made up in quantity such that the indicated quantity could be delivered into the reaction flask.

The mix in the flask was brought to 40° C. and 1 ml. of catalyst suspension was added, and rinsed in with 3 ml. methyl acetate. The mixture was heated and stirred for 20 min. at 40-60° C., one atm. pressure. It turned dark brown. The polyvinyl acetate methyl acetate mixture was then added and the whole was heated 40 minutes, 63-84° C., 1 atm. The mix became very dark brown and 5.0 ml. of distillate was collected.

The pressure was then reduced gradually over a period of one hour to 245 mm. while the mix was heated at 84 to 90° C. Distillate totaled 11.5 ml., and the mix became viscous, dark brown. The mix was cooled to 80° C. and 0.3 ml. additional catalyst suspension was added. Stirring and heating was continued, 30 min. at 72-83°, one atm., then with pressure gradually reduced to about 15 mm., over a period of 25 min. while the temperature was raised to 97° C. Heating was continued for another 20 minutes at 97-97½° C. Distillate totaled 15.6 ml.

The reaction was then stopped by addition of 2 ml. glacial acetic acid, after the vacuum had been broken by admission of nitrogen.

Thirty-one and six-tenths grams of product and 16.8 grams of distillate (saponification number 702) were obtained.

The reaction product was extracted with 95% ethanol to remove the sodium acetate resulting from neutralization of the catalyst, together with any Cellosolve esters and methyl esters that might be present. The product after the extraction with alcohol was heated with stirring for one hour at 100° C. and 30 mm. pressure to remove any dissolved alcohol.

The purified product, consisting of 12.4 g. of mixed polyvinyl ester of linseed oil and coconut oil fatty acids and acetic acid was a clear, red viscous oil, having an acid number of 8.5; saponification number 300; iodine number 90.3 and a viscosity in 10% solution in benzene at 40° C. of 1.96 cks.

*Drying tests on product.*—Hexane solution, without added drier, spread on glass, on paper, and on sheet aluminum, dried in three days to tough, flexible, colorless film. The films did not get as hard as those made of higher iodine number products, like the ester of Example III, but were as hard or harder than films made from linseed oil.

Considering the low iodine number of this product, its drying properties are remarkable, even though the films do not get as hard as those of some of the other polyvinyl esters. Since the original mix had an excess of acetate groups, over methyl esters, the product contained acetate groups, as well as linseed and coconut fatty acid groups. The saponification number indicates this to be the case.

EXAMPLE VIII

*Polyvinyl mixed stearate—acetate esters (methyl acetate promoter and solvent)*

Starting materials: Weight
- Polyvinyl acetate, AYAC _____ g__ 35
- Methyl stearate _____ g__ 135.4
- Methyl acetate, dried _____ g__ 99.4
- Sodium hydride suspension 0.28 g./ml. _____ ml__ 5

*Procedure.*—The polyvinyl acetate was put into a reaction flask and heated under vacuum by means of a boiling water bath for 1 hour, to make sure that the material was dry. The flask was then cooled and 90.1 g. of dried methyl acetate was added. The mixture was heated to 50° C. and stirred until homogeneous, then 135.4 g. of methyl stearate was added.

With the mix at 50° C., and agitation, 5 ml. of catalyst suspension was added, and the inlet tube was rinsed down with 10 ml. of methyl acetate.

The mixture frothed and became grayish yellow in color, gradually turning to a turbid brown. The water bath surrounding the flask was heated to boiling within 20 minutes while the mixture was being stirred at one atmosphere pressure. Temperature of the reaction mix at the end of the 20 minutes was 89° C.

The pressure was then reduced gradually over the next 20 minutes to about 20 mm., while the mixture was heated with the boiling water bath, and the mix was then held for an additional 20 minutes at this pressure and temperature. The mixture was light brown and turbid.

The vacuum was then broken by admission of nitrogen and the mix was allowed to stand overnight without further heating. The mix settled into two layers which solidified on standing. The appearance and general behavior showed that not much reaction had taken place, and that the two layers were principally the original methyl stearate and polyvinyl acetate. This was confirmed by the fact that the distillate collected was 101.7 g. as compared with 101.9 g. of volatile material originally introduced in the reaction mixture (99.4 g. of methyl acetate originally added plus about 2.5 g. of hexane introduced with the catalyst).

The mixture was strongly alkaline to phenolphthalein in alcohol, however, showing that not all of the catalyst had been destroyed.

Without addition of more catalyst, the mix was brought together again by addition of 50 grams of dried methyl acetate. The mixture was heated again at 1 atmosphere pressure, this time more slowly. At the end of 80 minutes the water bath had been heated to boiling and the mix temperature was 88° C. At the end of 97 minutes, the pressure was reduced gradually. Full vacuum of the aspirator was reached at the end of 160 minutes, with the temperature of the reaction mix at 95° C. After an additional 30 minutes, the vacuum was broken with $N_2$. Distillate collected was 60.2 g., that is 10.2 g. more than the methyl acetate added at the beginning of this stage of reaction. The reaction mix was still definitely alkaline to phenolphthalein.

A third stage of reaction was carried out by adding 20 g. of methyl acetate and heating mix for 2 hours with boiling water bath, with the pressure at one atmosphere at the start, and reduced gradually to full vacuum of the aspirator. In this stage, 20.3 g. of methyl acetate was collected; i. e., 0.3 g. more than the quantity added. The mix was still alkaline to phenolphthalein. Acetic acid, 5 ml. was added to neutralize the catalyst. After acidulation the mix had an orange-red color.

A weight balance showed that 2.5 g. of material had been lost during the reaction. Part of this loss probably was methyl acetate that got past the condensers.

*Treatment of reaction product.*—The product was mixed with benzene and transferred to a separatory funnel. The mixture was shaken with 200 ml. of 1 N aqueous HCl. This gave an emulsion that did not separate readily. By successive additions of alcohol and hot water, it was possible to get the aqueous layer to settle out, but the upper layer did not get clear and the separations were not good. After several water-washings, the upper layer was heated to 100° C. under vacuum to remove the solvent.

The solvent-free material, 151.4 g., was then heated in a distilling flask to 240° C., with $CO_2$ bubbling through the liquid at about 2 mm. pressure, to distill off the unreacted methyl stearate.

Distillate: 75.4 g.

*Product.*—76.0 g. light tan-colored wax, harder and more brittle than beeswax. Clear light brown liquid when melted. Makes a clear solution in hexane. Capillary melting point, 43.8° C. Acid No., 5.7. Saponification No., 270.

The saponification number of the product, in comparison with those of the methyl stearate (194) and the polyvinyl acetate (633) indicates that the product consists of 19% by weight of polyvinyl acetate and 81% polyvinyl stearate. Of course, the acetate and stearate groups will be mixed through the whole polyvinyl mixed ester, and not in separate portions; i. e., practically every molecule contains both acetate and stearate groups.

On an equivalent basis, this proportion is 44% acetate, 56% stearate; i. e., 56% of the acetate groups originally present were replaced by stearate groups.

EXAMPLE IX

*Polyvinyl stearate and tristearin mixed esters (methyl acetate and triacetin as mutual solvents and promoters)*

In this experiment, triacetin was added to give a reaction which would form mixed polyvinyl and glycerol esters of stearic acid. The proportion of triacetin was such that the product would be expected to consist of a little over three-fourths polyvinyl esters and a little less than one-fourth triglycerides. The methyl stearate used was not quite equivalent to the sum of the triacetin and the polyvinyl acetate.

Materials: Quantity
Polyvinyl acetate, AYAC, saponification
  No. 633_____g__ 16.0
  Triacetin _____g__ 4.0
  Methyl stearate_____g__ 60.0
  Methyl acetate, dried_____g__ 68.6
  Sodium hydride suspension_____ml__ 3

*Procedure.*—All the ingredients, except catalyst and part of the methyl acetate, were put into a reaction flask and brought to 42° C. This made a turbid yellow solution. The sodium hydride suspension, 3 ml. was then added and rinsed in with 10 ml. of methyl acetate.

The mixture was heated for one hour at atmospheric pressure, with the temperature gradually raised to 86° C. Distillate amounted to 52½ ml.

The pressure was then reduced gradually. After 23 min., with pressure at the end of this time equal to 580 mm., total distillate amounted to 83.6 ml. Heating for 34 minutes longer, with final pressure of 60 mm., yielded 2 ml. additional distillate.

Glacial acetic acid, 5 ml., was added to neutralize the catalyst.

Distillate from reaction: 85 g.
Product in flask: 77.4 g. hard reddish solid.

*Treatment of reaction product.*—The product was heated with hexane under reflux and transferred to a separatory funnel, using two 100 ml. portions of the solvent. Solution was shaken with 200 ml. of warm water. An emulsion formed, which was broken by addition of 25 ml. butanol. The water was drawn off, and the solution was washed with three additional portions of warm water.

The solvent was then distilled off under vacuum with a final temperature of 135° C.

The product was then heated to 233° C. at 1 mm. pressure to distill out unreacted methyl stearate.

Distillate: 12.2 g. (18%)
Undistilled residue: 55.7 g.
Characteristics of undistilled residue: Hard, brittle, light tan-colored wax. Soluble in hexane. Acid No. 0.97. Saponification No. 235. Melting point 46–48.8° C. Viscosity of 10% soln. in benzene at 40° C., 1.22 cks.

Calculated saponification number of a product in which all of the acetate groups of both polyvinyl acetate and triacetin are replaced by stearate: 185.

Calculated percentage of stearate (both polyvinyl and glycerol) to total ester, by weight, in final product: 89%.

EXAMPLE X

*Mixed polyvinyl linseed oil fatty acid esters and glycerol linseed oil fatty acid esters*

Materials: Quantity
Polyvinyl acetate, AYAC_____g__ 53.3
Triacetin _____g__ 19.3
Linseed methyl esters_____g__ 223
Methyl acetate, dried_____g__ 158.5
Sodium hydride_____ml__ 10

*Procedure.*—The polyvinyl acetate was dissolved in 150 g. of methyl acetate in a reaction vessel. The linseed methyl esters and triacetin were then added. This gave a clear fluid solution at room temperature.

Nitrogen was passed through the vessel for a short time to replace air, then 6 ml. of the sodium hydride suspension was added through its inlet tube, and rinsed in with 5 ml. of methyl acetate. The mixture was stirred for 9 min. at 38–35° C., then 4 ml. more of hydride suspension was added, rinsed in with 2½ ml. of methyl acetate.

Mixing was continued 40 minutes at atmospheric pressure, 36–41° C. The heat was then gradually increased for a period of one hour at atmospheric pressure, bringing the temperature to 89° C. Distillate came over rapidly.

The pressure was then gradually reduced, reaching about 15 mm. in one hour, temperature, 96–98° C. Heating was then continued for another 1½ hours.

The vacuum was then broken with nitrogen, and the mix was acidulated with 10 ml. glacial acetic acid, followed after 30 min. stirring, by 9.6 g. of 85% phosphoric acid.

Reaction product: 257.6 g. red-brown fluid.

*Treatment of reaction product.*—The product was divided into three portions, and each portion was subjected to a different method for removing unreacted methyl esters.

1. *Water-washing, followed by distillation.*—A 75 g. portion was dissolved in hexane (100 ml.), transferred to a separatory funnel and washed with six 75 ml. portions of warm water. The solvent was distilled off as in previous experiments and the washed sample was heated to 240° C. at about 1 mm. pressure to distill out methyl esters.

Distillate was 14.3 g. (21.6% of the sum of distillate and undistilled residue). Viscosity at 100° C., 1.57 cks. Undistilled residue: 50.05 g. turbid, light-brown oil. This residue comprising the product had an acid No. of 4.8, saponification No., 233.5, and iodine No. 158. Viscosity of 10% solution in benzene at 40° C. was 1.43 cks.

2. *Repeated extraction with 95% ethanol.*—Another 75 g. portion of the reaction product was treated by three successive extractions with hot 95% ethanol. These extractions were made by boiling under a reflux a mixture of the 75 g. sample with 150 g. 95% ethanol; then allowing to settle at 60° C., and siphoning off the supernatant alcohol layer.

Undissolved residue: It was dissolved in benzene and filtered to remove a small quantity of insoluble material. After distillation of the benzene, weighed 38.5 g. Numbered 10–142D. Clear, dark red oil. Acid No. 6.4. Saponification No. 241. Iodine No. 160. Viscosity of 10% solution in benzene at 40°, 1.64 cks.

3. *Single two-phase liquid-liquid separation with alcohol and benzene.*—The remainder of the material in the reaction flask, about 100 g., was heated with 150 ml. benzene under reflux. The benzene solution was filtered to remove insoluble salts and divided into two portions, for treatment with different proportions of ethanol.

*Portion I.*—125 ml. of the solution in a graduated cylinder was shaken with 60 ml. of 95% ethanol and allowed to stand and settle.

Benzene layer: 93 ml., 83.3 g. clear, dark red. After removal of solvent, 34.1 g. clear dark red oil. Numbered 10–142IA. Acid No. 12.5. Saponification No. 242. Iodine No. 162. Viscosity of 10% solution in benzene, 1.38 cks.

*Portion II.*—89 ml. of solution was shaken with an equal volume of 95% ethanol and allowed to settle.

Benzene layer: 50 ml., 47.3 g. After removal of solvent, 23.5 g. No. 10–142IIA. Clear, dark red oil. Acid No. 6.4. Saponification No. 228. Iodine No. 161. Viscosity of 10% solution in benzene, 40° C., 1.41 cks.

EXAMPLE XI

*Polyvinyl linseed oil fatty acid esters (methyl Cellosolve acetate and methyl acetate as promoters and solvents)*

In the foregoing examples, the polyvinyl acetate AYAC had a viscosity in cyclohexanone at 20° C. of 0.11. The polyvinyl acetate of this example (AYAA) had a viscosity of 0.39.

Materials: Quantity
- Polyvinyl acetate, AYAA _____ g__ 45
- Methyl Cellosolve acetate _____ g__ 19.7
- Methyl acetate, dried _____ g__ 148.0
- Linseed methyl esters _____ g__ 190.0
- Sodium hydride suspension _____ ml__ 10

*Procedure.*—The polyvinyl acetate was dissolved in 140 g. methyl acetate in a reaction vessel. The methyl Cellosolve acetate and finally the linseed esters were added. The mix was heated to 50° C. and the catalyst was added.

The mix was heated at atmospheric pressure for 1¼ hours, with temperature gradually raised to 87° C. The pressure was then gradually reduced to about 15 mm. while the mixture was heated to about 97° C. After about 20 min. after the pressure was reduced, the vacuum was broken by admission of nitrogen, and 10 ml. glacial acetic acid were added to neutralize the catalyst. 150 ml. benzene were added and the mixture was boiled under reflux for about 30 min.

Distillate from reaction: 174 g.

The product in the reaction flask was a somewhat jelly-like material which would string out in rubbery strings. It was transferred to a ball mill and ground for 3 hours with 300 ml. of added alcohol (95%). This was for the purpose of dissolving any sodium salts and any methyl esters and Cellosolve esters.

After this treatment, the product was a dark-colored rubbery mass and the alcohol was a separate phase that could be poured off. Volume of alcohol layer poured off: 280 ml. Weight after removal of alcohol by distillation: 34.4 g. When filtered, this was a dark red fluid. Viscosity at 100° C., 2.0 cks.

The product after the alcohol treatment was put into a flask and heated with an oil-bath to 200° C. under vacuum until it appeared that solvent had been removed. The product was a porous, rubbery mass. Weight: 152.3 g. Saponification Number 202.5. The product can be milled or calendered into sheets easily, and is useful as a linoleum base.

EXAMPLE XII

*Polyvinyl esters of China-wood oil fatty acids*

Ester-ester interchange between polyvinyl acetate, AYAC and the methyl esters of China-wood oil was carried out with triacetin present to assist the reaction under the conditions of Example IV. The exchange took place without difficulty, but the product showed a strong tendency to form a gel in the solvents used in the washing procedures. Evidently the ready polymerization of the China-wood oil esters caused enough cross-linking to reduce the solubility of these esters in hexane.

A portion of the partly purified product was spread on glass. The material dried very rapidly, considerably more rapidly than a comparison sample of the original China-wood oil, and produced a frosted film. The frosting was very uniform and fine grained, so that the dried film looked like the surface of a ground glass plate.

EXAMPLE XIII

*Polyvinyl stearate (methyl acetate and methyl Cellosolve acetate as promoters)*

Ingredients: Weight
- Polyvinyl acetate, AYAC _____ g__ 26.25
- Methyl stearate _____ g__ 135.4
- Methyl Cellosolve acetate _____ g__ 11.73
- Methyl acetate, dried _____ g__ 84.3
- Sodium hydride suspension _____ ml__ 5

*Procedure.*—The polyvinyl acetate was placed in a reaction flask and dried after which the methyl Cellosolve acetate was added. The mixture was stirred and warmed until homogeneous, then cooled. Methyl acetate, 79.2 g., was added and the mixture stirred and warmed to 50° C. The methyl stearate was then added, melted, and the whole mix was stirred at 50° C.

The catalyst suspension was then added. The mixture frothed and rapidly assumed a grayish brown turbid appearance. The water-bath surrounding the flask was heated rapidly, so that it reached the boiling point in 27 min. During the first 30 minutes, the pressure was kept at one atmosphere. The mix gradually darkened, and methyl acetate distilled out.

The pressure was reduced gradually over a 20 minute period to about 20 mm. and held there for an additional 25 minutes, with the reaction flask surrounded by boiling water. Total reaction time, 75 minutes. Reaction mix was very dark colored and apparently homogeneous.

The stirring and heating were stopped, vacuum was broken with nitrogen and glacial acetic acid, 5 ml., was added to the reaction mix to neutralize the catalyst. The product still had a dark color after acidulation.

The distillate from the reaction was clear, colorless liquid with the odor of methyl acetate; weight 105.6 g. Weight of product in flask, 157.6 g.

*Treatment of reaction product.*—The product in the flask was heated for 30 min., with 250 ml. hexane, under reflux, then transferred to a separatory funnel where it was washed with 150 ml. of 1 N aqueous HCl and with water.

Solvent was removed by heating the hexane layer in a distilling flask to 130° C. under vacuum of an aspirator. Product at this stage was red and turbid.

The product was then heated in a distilling flask at 1 mm. pressure to 250° C. to distill out any methyl stearate and methyl Cellosolve stearate. Distillate, 73.0 g., a yellow low-melting solid. Residue, 72.4 g. orange-red brittle wax, turbid when melted.

Qualitative tests on the residue showed that the turbidity was due to sodium stearate present. Evidently the contact with the HCl solution in the washing procedure was insufficient to break up all the soap. To remove the sodium stearate, the product was heated with benzene and filtered. The filtrate was a clear red solution. After removal of the benzene by distillation, the product had the following characteristics: Saponification No. 185.5. Acid No. 1.7. Hydroxyl No. 20. Capillary melting point, 50° C. Reichert-Meissl No., practically zero (indicating that no measurable proportion of acetate remained in the product). Hard, light brown, brittle wax. Soluble in hexane.

The saponification number of the product is practically the same as the calculated value for pure polyvinyl stearate made from polyvinyl acetate and methyl stearate having the characteristics of our starting materials: in other words, the saponification number indicates that complete replacement of acetate was obtained.

EXAMPLE XIV

*Polyvinyl mixed esters of soybean oil fatty acids methacrylic acid*

| Ingredients: | Quantity |
|---|---|
| Polyvinyl acetate, AYAC | g 22.0 |
| Methyl methacrylate | g 32.0 |
| Methyl acetate, dried | g 20.0 |
| Refined soybean oil | g 71.0 |
| Sodium hydride suspension | ml 3 |

*Procedure.*—The polyvinyl acetate, methyl methacrylate and methyl acetate were placed in a reaction flask and mixed. When they had formed a homogeneous solution, the soybean oil was added. With the mixture at 45° C. the 3 ml. of sodium hydride suspension was added, with agitation. The mixture frothed and turned lemon yellow in color. Vapors from the reaction passed upward through a packed fractionating column, equipped with a partial condenser at the stillhead to cause the higher-boiling portions of the vapor to be returned to the reaction vessel. The water-bath surrounding the flask was heated to 65° C. in the first 10 min., while the mix was stirred at one atmosphere pressure. The mixture became darker colored and apparently more nearly clear.

The pressure was then gradually reduced to about 270 mm. Hg over the next 20 min., while the water-bath temperature was raised to 72° C. At the end of this time (30 min. total) 11 ml. of distillate had been collected in the receiver. The reaction mix was nearly clear and brown in color.

The pressure was gradually further reduced to about 90 mm. with the water-bath held at 74–75° C. Total reaction time, 75 min. The vacuum was then broken with nitrogen. A small sample of the reaction mix was found to give an alkaline reaction to phenolphthalein in alcohol.

Glacial acetic acid (3 ml.) was added to neutralize the catalyst.

The crude reaction product weighed 106 g. It was an orange-colored liquid containing some solid suspended material, probably sodium salts.

*Treatment of reaction product.*—The product was mixed with 1.4 ml. 85% phosphoric acid and 100 ml. of 95% ethanol and the mixture was held over a water bath at 60° C. to allow the layers to settle. The alcohol layer was drawn off and another 100 ml. portion of 95% ethanol was added.

After a total of 4 extractions, the combined alcohol extracts were filtered to remove salts that had precipitated and were heated to 100° C. under vacuum to remove the alcohol. The alcohol-free extract weighed 30.7 g.

The portion not dissolved in the alcohol extractions was mixed with benzene (140 ml.) and filtered to remove water-soluble salts, then heated under vacuum to 85° C., final pressure about 1 mm., to remove benzene. The extracted product was an orange colored, viscous oil. Weight 58.0 g.

The extracted product had the following characteristics:

| | Extracted product |
|---|---|
| Acid No | 6.4 |
| Saponification No | 306 |
| Iodine No. (Wijs) | 106 |

The alcohol extract contained the methyl esters that remained in the product at the end of the reaction, and probably part of the triglycerides that contained acetate or methacrylate groups. Also some polyvinyl ester may have been taken into the alcohol. The extracted oil was principally a mixture of polyvinyl mixed esters of soybean oil acids and methacrylic acid and triglycerides of soybean oil acids and methacrylic acid.

*Drying tests on synthetic oil of Example XIV.*—With added drier, an unpigmented film of the extracted oil dried much more rapidly than a comparison film of linseed oil, and became considerably harder within two days than the linseed oil became in more than two weeks.

Pigmented films of the oil dried very rapidly when drier was added and became much harder than the comparison samples containing linseed oil. Also the extracted oil paint held its whiteness, while the linseed oil films yellowed noticeably in about two weeks.

Without drier, the extracted oil paint was slower than the linseed oil paint to dry to the tack-free stage, but eventually it formed a harder film than the linseed paint, and held its whiteness, after the linseed had started to yellow.

*Gelation tests on the synthetic drying oil of Example XIV.*—A Browne heat test as described on p. 426 of the 10th edition of Physical and Chemical Examination of Paints, Varnishes, Lacquers and Colors, by Gardner and Sward gave a gelation time of 2 min. 30 sec. for the oil as compared with 7 min. 45 sec. for a sample of tung oil.

The very rapid gelation suggested that the oil might solidify at a considerably lower temperature than 280° C. A 2 ml. sample of the oil heated in a small test tube in an oil-bath solidified when the temperature reached 145° C.; time of heating was about 30 min. Part of the color bleached out during the heating.

EXAMPLE XV

Polyvinyl linseed oil fatty acid esters

Polyvinyl linseed oil fatty acid esters were prepared under conditions chosen to effect complete replacement of acetate groups from the polyvinyl acetate, i. e., methyl acetate and methyl Cellosolve acetate were used to promote rapid reaction and linseed methyl esters were used in excess. Unreacted methyl esters and Cellosolve esters left at the end of reaction were distilled from the product.

The method of removing inorganic salts resulting from neutralization of the catalyst differed from most of the preceding experiments, a simple filtration being used instead of the washing technique.

| Ingredients: | Quantity |
|---|---|
| Polyvinyl acetate, AYAC _____g__ | 50.0 |
| Linseed methyl esters _____g__ | 230.0 |
| Methyl Cellosolve acetate _____g__ | 17.0 |
| Methyl acetate, dried _____g__ | 93.0 |
| Sodium hydride suspension (0.34 g. NaH per ml.) _____ml__ | 6.3 |

*Procedure.*—The ingredients, except catalyst, were mixed in the reaction flask, then warmed to 48° C. Catalyst suspension was then added to the stirred mix in two portions a few minutes apart. The mixture frothed and turned brown. The water-bath surrounding the reaction flask was heated rapidly, and reached the boiling point in 25 minutes. Pressure was one atmosphere. With the water-bath boiling, and reaction mix at 90° C., the pressure was gradually reduced to about 15 mm. in the next 20 minutes and held there for another half-hour. Temperature inside the flask rose to 100° C. The vacuum was then broken with nitrogen and glacial acetic acid (7 ml.) was added. Before the addition of acid, a small sample tested in alcohol with phenolphthalein gave a slight pink color.

Phosphoric acid (5.8 g. of 85% acid) was then added and stirred vigorously into the mix to convert all the sodium compounds to salts of phosphoric acid. After thorough mixing, the product was filtered through paper on a suction filter. Distillate obtained during reaction was 131.9 g.

*Treatment of filtered reaction product.*—The filtered product was heated in a distilling flask surrounded by an oil-bath to distill off methyl esters and methyl Cellosolve esters. Final temperature on oil-bath, 250° C., pressure during distillation, about 1 mm. or less.

The weights were as follows: Distillate collected, 91.5 g.; undistilled polyvinyl ester, 121.0 g.

*Characteristics of reaction product.*—The product was a clear light brown viscous oil. The clarity shows that the filtration method removed all the sodium salts. Iodine No. 162; saponification No. 207; acid No. 1.9. Viscosity of a 10% solution in benzene at 40° C. 1.75 cks. A Reichert-Meissl determination indicated that the product contained not more than about 1.5% combined acetic acid.

*Tests on polyvinyl linseed oil fatty acid esters as a drying oil.*—Various tests made with this product showed it to be a remarkable drying oil. It dries much faster than linseed oil to a clear, hard, glossy film. White paint made by mixing the oil with white lead, zinc oxide and thinner dries rapidly, like an enamel, to a hard film with a high gloss.

A mixture of the oil with about one volume of turpentine plus one volume of hexane and a little commercial drier (Dutch Boy Liquid Drier) was used as a varnish on some redwood boards, in comparison with a commercial varnish. The mixture had good brushing properties and dried a little more rapidly than the commercial varnish. Appearance was as good or better than the commercial varnish.

The same mixture was applied to linoleum under conditions of actual use. After forty days the finish showed little sign of wear and gave the linoleum a high gloss and much improved depth of color.

EXAMPLE XVI

In a three-necked reaction flask, equipped with a thermometer, a stirrer, and an air cooled condenser equipped with a water cooled refluxing still head was placed one equivalent weight of polyvinyl acetate, AYAC, one equivalent weight of undistilled methyl esters of soybean oil, and 1.77 equivalents of isopropyl acetate as a solvent and reaction promoter. Sodium hydride in an amount equivalent to 0.76% of the reaction mixture thus obtained was then added. The mixture was heated at a temperature of from 90 to 96° under a pressure of 1 atmosphere for a period of about one hour. The pressure was gradually reduced to 200 mm. during the next hour and during the last fifteen minutes of the reaction to about 90 mm. A product soluble in benzene was obtained which was analogous to previously described soybean acid ester derivatives of polyvinyl alcohol.

EXAMPLE XVII

The procedure described in Example XVI was repeated with the exception that allyl acetate was employed as a solvent and reaction promoter. Likewise, in this instance, a sodium hydride catalyst was added in two portions, each equivalent to about 0.88% of the total weight of the reaction mixture. The first portion was added at the beginning of the reaction and the second portion after the first hour of reaction. A product similar to that described in Example XVI was obtained.

EXAMPLE XVIII

The process described in Example XVI was repeated with the exception that a mixture of dimethoxy tetraethylene glycol and soybean oil in an amount sufficient to provide about 0.23 equivalent of the oil, and about 1.2 equivalents of the glycol were used. Likewise, 0.7 equivalent of soybean methyl esters were utilized and the catalyst was added in two portions in a total amount equal to 1.07% of the weight of the reaction mixture. A viscous oil having a Gardner color in excess of 18 and a Gardner viscosity of Z-3 was obtained.

EXAMPLE XIX

The process described in Example XVI was repeated with the exception that anisole was employed as a reaction medium and no promoter was utilized. A product analogous to that described in Example XVI was obtained.

EXAMPLE XX

A commercial grade of polyvinyl acetate (Bakelite Corporation's Grade AYAC) having a specific viscosity of 0.75 in benzene at 25° C. at a concentration of 50 grams per liter of solution, and a saponification number of 640, corresponding to an equivalent weight of 88, was dissolved in dry, redistilled, peroxide-free dioxane. The moisture in the polyvinyl acetate was removed by distilling off part of the dioxane through a fractionating column at a reflux-ratio of about 20 to 1, until the temperature of the dioxane at the head of the column became constant.

Of the dried solution, 80 grams, containing 20 grams of polyvinyl acetate and 60 grams of dioxane, was put into a reaction vessel consisting of a 4-necked round-bottom 300 ml. flask, equipped with a motor-driven stirrer, a reflux condenser, a thermometer, and a glass tube suitable for withdrawing samples and for adding reagents. The upper end of the reflux condenser was connected by suitable lines and cocks to a manometer, a vacuum line and a cylinder of nitrogen.

With the solution in the flask at room temperature, the air in the flask was removed and replaced by nitrogen, by three times successively reducing the pressure to about 30 mm. of mercury and bringing it back to 1 atmosphere by admitting nitrogen.

In another flask, similarly equipped, a catalyst solution was prepared as follows:

Freshly dried and redistilled tetrahydrofuran, 65 grams, resublimed naphthalene, 8.5 grams, and metallic sodium, 1.5 grams, in small pieces approximating $\frac{1}{8}$" cubes, were placed in the flask, and the air in the flask was replaced by nitrogen. The mixture was then stirred for 1 hour at room temperature. The sodium started to dissolve almost immediately when the stirring was begun, and formed a very dark green solution. To this solution was then added 148 grams of distilled methyl esters of soybean oil. These esters were made by methanolysis of refined soybean oil followed by distillation of the washed and dried esters at reduced pressure. The distilled esters had an acid number of 0.1; iodine No., 123; saponification No., 195. Immediately upon addition of the esters to the solution, the green color disappeared and the mixture became orange-red in color with only slight turbidity. The tetrahydrofuran was then distilled from the mixture by reducing the pressure to about 15 mm. of mercury and raising the temperature of the mixture to 60° C. A titration of a sample of the mixture was made by adding the sample to a mixture of benzene and acetic acid, then adding neutral alcohol and thymol blue indicator, and titrating with aqueous NaOH. Comparison with a blank titration with the same quantity of benzene-acetic acid mixture showed that the catalyst-ester mixture contained alkaline material equivalent to 0.0095 gram sodium per ml. of mixture, which indicated that all the sodium originally added was in solution in the mixture.

The polyvinyl acetate solution in the main reaction flask was heated to 60° C., by means of a water-bath surrounding the flask, and to it was added with rapid stirring, 33.7 grams of soybean methyl esters of the above described type followed by 42 ml. of the catalyst-ester mixture described. The transfer was made with a glass syringe, without opening the flasks to the air. The quantities of material in the resulting reaction mix were as follows: Polyvinyl acetate, 20 g. (0.23 equivalent); dioxane, 60 g.; soybean methyl esters, 68.1 g. (0.23 equivalent); naphthalene, 2.2 g.; sodium, 0.4 g. Stirring of the mixture at 60° C. was continued. Samples withdrawn from time to time were examined by tests on viscosity in benzene solution and on solubility in petroleum ether. The reaction mixture originally was a clear solution, which gradually darkened in color to a deep red. The viscosity gradually increased, showing that reaction was taking place. At first, when a sample was added to petroleum ether, polyvinyl acetate would be precipitated, but after 82 minutes, the reaction had progressed far enough to render the product soluble in petroleum ether.

At the end of 4 hours, stirring and heating were discontinued. After the mix had stood overnight, the mix was again heated to 60° C. and stirring was continued for an additional 6 hours. By this time, only 30% of the original alkalinity remained. To the mixture was added 1 ml. of glacial acetic acid. This lightened the color considerably. Then 1.2 ml. of concentrated aqueous hydrochloric acid was added and the stirring was continued at 1 atmosphere pressure for 15 minutes, after which the pressure was reduced and the mixture heated to 100° C. to distill out methyl acetate, dioxane and any excess of hydrogen chloride.

The mixture was then filtered on a suction filter with diatomaceous earth as a filter-aid. The product was a clear red oil: Gardner color No. 17; Gardner viscosity N. This product was put into a distilling flask and distilled with the aid of steam at a pressure of 1 mm. of mercury and a final temperature of 246° C., to remove any unreacted methyl esters together with naphthalene and any other volatile material. The yield of distillate was 42% of the sum of distillate and undistilled residue. The residue comprising the polyvinyl ester resulting from the reaction was a viscous, reddish-colored oil, soluble in mineral spirits, having a saponification number of 270, Gardner-Holdt viscosity at 25° C., Z-8. Calculations based on the yields of product and distillate agree with those based on saponification number of the final product in showing that slightly more than 50% of the acetate groups in the polyvinyl acetate were replaced by the fatty acid radicals of soybean oil. This indicates that the reaction went all the way to equilibrium, since approximately 50% replacement would be expected at equilibrium when equivalent quantities of acetate and replacing esters are present.

EXAMPLE XXI

Kettle-rendered lard, having an iodine number of 66 and saponification number of 195 was converted to methoxyethyl esters by alcoholysis of the glycerides with methoxyethanol ("methyl Cellosolve") containing dissolved sodium as catalyst. The esters were distilled under vacuum to separate them from any remaining glycerides.

Into a reaction vessel as described in Example XX was placed a dried solution of polyvinyl acetate (AYAC) prepared as described in Example XX, in a quantity containing 20 g. polyvinyl acetate and 62 g. dioxane. To this was added 88 g. of the methoxyethyl esters of lard. When heated and stirred, this mixture was clear and homogeneous at 67° C.

In a separate flask, a catalyst solution was prepared by stirring a mixture of 1 g. sodium, 32 g. tetrahydrofuran (pure and dry) and 5.7 g. naphthalene, for 75 minutes at room temperature in an atmosphere of nitrogen. Titration showed that nearly all the sodium had gone into solution.

The mixture in the reaction vessel was heated to 76° C. and 13.3 ml. of the catalyst solution was added, containing 0.28 g. of dissolved sodium. The mixture was stirred and heated to 80° C. Samples taken from the mix showed that ester interchange took place very rapidly. Within 8 minutes the resin was soluble in petroleum ether, and within 30 minutes the mixture had reached its maximum viscosity.

In comparison with a companion experiment with methyl esters of lard made under the same conditions and with the same proportion of catalyst, the rate of reaction of the methoxyethyl esters was 10 times that of the methyl esters. In another experiment with isopropyl esters of lard fatty acids, practically no reaction was obtained, even after a second addition of catalyst, equal to the quantity added at first.

After 90 minutes at 80° C., the reaction was stopped by addition of 0.75 ml. of 85% phosphoric acid. The mixture was stirred while the pressure was reduced to distill out dioxane. After filtration to remove the salts, 85 ml. of the treated product was given a liquid-liquid extraction treatment as follows: The product was mixed with 2 volumes of methyl acetate and 1 volume of methanol. The mixture was stirred vigorously for 15 minutes at room temperature, then settled for 1 hour. The top layer, 217 ml., was drawn off and the residue was stirred with 90 ml. of methyl acetate and 45 ml. of methanol. After settling overnight, the top layer, 170 ml., was drawn off, and a third extraction, like the second was made.

The residue was heated under vacuum to remove solvent and was found to be a viscous oil; Gardner color, No. 16; Gardner-Holdt viscosity, Z9.

A distillation treatment at a final temperature of 250° C., 1 mm. pressure, yielded no distillate, showing that the extraction procedure had removed all volatile material. The final product had the following characteristics: Gardner color No. 15; Gardner-Holdt viscosity, Z9; specific viscosity, benzene, 25°, 50 g. per liter, 1.08; saponification No. 273. The product is a viscous oil, soluble in organic solvents, including mineral spirits. The low melting point of this oil is remarkable, in comparison with the original lard, which is a semi-solid at room temperature. The polyvinyl lard ester can be chilled to —70° C. without causing it to crystallize. At this low temperature it is a hard glass, but does not crystallize, nor can it be induced to crystallize by chilling to such temperature followed by holding at —17° C. for weeks. Also remarkable is the fact that a film made by spreading a solution of the product, with added drier, on glass with a doctor-blade dries to a clear, colorless, slightly tacky film in about 20 hours. While the drying properties are inferior to those of a corresponding ester of soybean acids, they are considerably superior to those of soybean oil, which has more than twice as high an iodine number.

EXAMPLE XXII

Methoxyethyl esters of lard fatty acids were prepared by ester-ester interchange at 60° C. between distilled methoxyethyl acetate (methyl Cellosolve acetate) and distilled methyl esters of lard fatty acids. The reaction was carried out with an excess of methoxyethyl acetate, using catalyst prepared as in Example 1. Methyl acetate was distilled out in quantity equivalent to complete reaction. The pressure was then reduced further and the temperature raised to distill out the excess of methoxyethyl acetate.

A 52 g. portion (0.16 equivalent) of these esters was put into a reaction flask with 20 g. (0.23 equivalent) of dried polyvinyl acetate (AYAC) dissolved in 60 g. of dried and redistilled 2-methyl tetrahydrofuran. The outlet from the flask led to a condenser and graduated receiver, and thence to manometer, vacuum pump and nitrogen cylinder.

In a separate flask, a catalyst solution was made by stirring for 2 hours, under nitrogen, a mixture of 6 g. naphthalene, 36 g. 2-methyl tetrahydrofuran and 1.2 g. sodium.

The mix in the reaction flask was clear at 66° C. To it was added 20 ml. of the catalyst solution, containing 0.37 g. dissolved sodium. The mixture was stirred while the pressure was reduced to cause rapid distillation of the solvent. In 23 min., with the mixture at 59–68° C. and with the pressure gradually reduced to 42 mm., 72.3 g. of distillate was collected, containing 0.03 equivalent of acetate. This distillate contained most of the methyl tetrahydrofuran that was used as solvent.

The reaction mixture was a homogeneous, viscous liquid. Stirring was continued while the pressure was reduced further and the temperature was gradually raised to 96° C. After a total time of 160 min., final pressure, 1 mm., an additional 15.8 g. of distillate had been collected, containing 0.106 equivalent of acetate, to make a total of 0.14 equivalent of acetate recovered, showing that at least seven-eighths of the methoxyethyl esters of lard had been converted to polyvinyl esters.

These results show that after the reaction mixture had been converted to a homogeneous material in the early stages of the reaction, the reaction may be continued after removal of the mutual solvent.

The product was acidulated with 1 ml. of 85% phosphoric acid and extracted with a mixture of 108 ml. of methanol and 72 ml. methyl acetate which mixture was stirred into the product for 90 min. at room temperature then allowed to settle overnight.

The upper layer was drawn off. After removal of the solvent, the extract was a relatively non-viscous oil, amounting to about 6% of the combined weight of extract and product. It deposited crystals of fatty acid on cooling, and had an acid number of 46.

The extracted residue was dissolved in petroleum ether and washed three times with water. After removal of solvent and moisture the product was a clear bright viscous oil, Gardner color No. 16; viscosity, Z7, saponification No. 236; acid No. 2.2; specific viscosity, 0.90.

These results show that in the reaction of methoxyethyl esters of higher fatty acids with an excess of polyvinyl acetate under conditions which favor distillation of methoxyethyl acetate during the reaction, the higher fatty acids can be converted almost completely from methoxyethyl esters to polyvinyl esters.

EXAMPLE XXIII

Furfuryl esters of soybean fatty acids were prepared from redistilled furfuryl acetate and distilled methyl esters of soybean oil by the method described in Example XXII for the methoxyethyl esters.

The furfuryl esters were interesterified with polyvinyl acetate under the conditions described in Example XXI. The reaction took place at the same rate as that observed in Example XXI, showing that the furfuryl esters react at a rate comparable with that of the methoxyethyl, glyceryl and similar esters, and at a much greater rate than the methyl esters.

As illustrated in the foregoing examples, the process of producing polyvinyl esters of higher fatty acids by ester-ester interchange with polyvinyl acetate may be varied in a number of ways to adapt it to the practical use of various raw materials and to the production of products covering a wide range of characteristics. The ester-ester interchange may be combined in advantageous ways with processes for the preparation of the materials entering the reaction.

For example, the polyvinyl ester may be prepared by polymerization of vinyl acetate in a solvent suitable for use as a reaction medium for the ester-ester interchange and the resulting solution may be used without removal of the solvent prior to the ester-ester interchange reaction.

When the natural fats are the source of the higher fatty acids to replace acetate, the glycerides themselves may be used in the reaction and the mixed glycerides resulting may be removed from the polyvinyl esters by extraction with a partially miscible solvent.

Alternatively the fats may be converted to esters other than glycerides before entering the interchange with polyvinyl acetate. For example, they may be converted to methyl esters and glycerol by methanolysis, and the methyl esters in turn converted to more reactive esters such as methoxyethyl esters by alcoholysis with methoxyethanol, or by ester-ester interchange with methoxyethyl acetate. In the latter case, this conversion may be carried out prior to the ester-ester interchange with polyvinyl acetate, or it may be simultaneous with it, in which case the methoxyethyl acetate may be considered to be mutual solvent and activator in the polyvinyl acetate interchange reaction.

The proportion of acetate replaced may be varied, depending upon the proportion of higher fatty esters used, upon the time of reaction and other reaction conditions and upon the proportion of acetate distilled from the mixture while reaction is in progress.

EXAMPLE XXIV

To the reaction vessel described in Example XX was connected a fractionating column, having a 12 inch section packed with glass helices and a still-head with a water-cooled condenser to allow control of the reflux ratio. The top of the column was connected to a receiver chilled with solid carbon dioxide-alcohol mixture, and thence to manometer, vacuum pump and nitrogen cylinder.

In the reaction flask was placed 20.2 g. of polyvinyl acetate (AYAC) and 37 g. of diethylene glycol diethyl ether (purchased under the trade name Diethyl Carbitol) which previously had been purified carefully to remove moisture and alcohols. This mixture was boiled at a pressure of 15 mm. of mercury and the vapors were passed through the fractionating column, until 2 ml. of liquid had distilled out. This was for the purpose of removing moisture from the polyvinyl acetate.

In a separate flask, a catalyst mixture was prepared by stirring for 90 minutes, in a nitrogen atmosphere, 44.5 g. of purified diethylene glycol diethyl ether, 5.6 g. naphthalene and 1.05 g. sodium. To the resulting black mixture was added 80 g. of distilled soybean methyl esters. Titrating a sample of the resulting mixture showed that it contained the equivalent of 0.0044 g. sodium per ml., showing that about two thirds of the sodium had dissolved.

The mixture in the main reaction vessel was warmed to 65° C., and a portion of the catalyst-ester mixture was added to it, together with enough more soybean methyl ester to make the whole mixture contain 20 g. (0.23 equiv.) of polyvinyl acetate, 75 g. (0.26 equiv.) of soybean methyl esters, 69 g. of diethylene glycol diethyl ether, 4.2 g. of naphthalene and 0.5 g. of sodium.

The temperature was raised rapidly to 80° C. and the pressure was reduced gradually to cause the mixture to boil. Some refluxing took place in the column, so that the vapors passing through the column consisted principally of methyl acetate. In one hour of this treatment, 9 g. of distillate, containing 7 g. of methyl acetate was collected. After the mix had stood overnight, it was heated again to 80° C. for 5 hours with gradual distillation of solvent from the mix. The concentration of methyl acetate in the distillate gradually diminished. The total methyl acetate recovered amounted to 8.6 g., or 0.116 equivalent. Probably some methyl acetate was lost, so that the total evolved was greater than this.

After the mixture had cooled to about 60° C., 1.3 ml. of concentrated aqueous hydrochloric acid was added to break up the sodium compounds, after which the mixture was stirred and heated to 100° C. under reduced pressure and then removed from the reaction flask and filtered on a suction filter.

The product was given a distillation treatment at 1 mm. pressure, 250° C. final temperature, to remove any volatile materials. The final product was a heavy-bodied oil: Gardner color, No. 14; Gardner-Holdt viscosity, Z9, saponification No. 220. This value indicates that 75% of the acetate groups were replaced.

EXAMPLE XXV

A catalyst mixture was made by stirring a mixture of 50 g. of purified ethyleneglycol diethyl ether, 6.4 g. naphthalene and 1.6 g. sodium for 1 hour in an atmosphere of nitrogen. Titration showed the alkalinity to be equivalent to 0.0168 g. sodium per ml.

In a reaction vessel arranged as described in Example XXIV, was put a dioxane solution of polyvinyl acetate prepared as in Example XX, together with soybean methyl esters, in quantities to make the mixture 20 g. polyvinyl acetate, 58 g. dioxane and 77.5 soybean methyl esters. To this mixture was added 15 ml. of the catalyst mixture described above, estimated to contain sodium compounds equivalent to 0.25 g. sodium.

The mixture was stirred in a nitrogen atmosphere at 60° C. for three hours. Observations on samples taken during this time showed that interchange was taking place at about half the rate of the reaction in Example XX. The stage at which the resin became soluble in petroleum ether was reached in 175 minutes.

At the end of the three hours, an additional 13 ml. of the catalyst solution was added. After an additional 1 hour at 60° C., the pressure was reduced and distillate was taken off through the fractionating column, amounting to 20.2 g.; this was found to contain 4.9 g. of methyl acetate. Allowing for the samples withdrawn during the reaction, this corresponds with about 40% of the total available acetate. A further 3 hour heating period, with gradual distillation of 33 g. of distillate yielded additional methyl acetate to give a total corresponding with about 55% of the total available acetate.

After addition of 2 ml. of hydrochloric acid, the mixture was stirred and heated while the pressure was reduced to distill off dioxane together with water and any excess of HCl. The product was dissolved in benzene and filtered, after which the benzene was distilled off and the product was given a distillation treatment to remove unreacted methyl esters together with any other volatile material.

The yield of product corresponded with replacement of two-thirds of the acetate by soybean acid radicals. Saponification number of the product corresponded with replacement of three-fourths of the acetate. The product had the following characteristics: Gardner color 18; Gardner-Holdt viscosity, Z6–Z7; acid No. 5.3; saponification No. 220; iodine No. 109; specific viscosity in benzene at 25° C., 50 g. per liter, 0.955.

Drying tests made with a solution of the product in mineral spirits, with added drier, showed that the product dries rapidly to clear, colorless films having remarkable toughness and durability. The drying properties are in an entirely different class from those of the original soybean oil.

EXAMPLE XXVI

Catalyst solution and reaction mixture were prepared as in Example XXV. The mix in the reaction vessel was heated to 110° C. before the first addition of catalyst. A quantity of catalyst solution containing 0.25 g. dissolved sodium was added, and the mixture was stirred at 109–112° C. for 15 minutes. Titration of a sample showed that only one-sixth of the catalyst remained after the first 3 minutes, and viscosity measurements showed that very little interchange had occurred in 15 minutes.

Another portion of catalyst solution was added, containing 0.21 g. sodium. The mixture was stirred at 108–100° C. for 30 minutes, with the pressure reduced gradually to cause distillation through the fractionating column. Distillate collected was 6.6 g. containing 2.1 g. methyl acetate, about one-eighth of the quantity corresponding with complete replacement. Catalyst concentration had dropped to a very low value, and further heating for 45 minutes at 95–105° C. with distillation of solvent through the column yielded practically no more methyl acetate. The resin was not soluble in petroleum ether.

A third addition of catalyst was made, containing 0.19 g. of sodium, followed by one hour's stirring at 95–110° C. with distillation of solvent through the column at slightly reduced pressure yielded 2.8 g. methyl acetate in the distillate. Catalyst remaining was about one-third of the quantity added in the last addition.

A fourth addition of catalyst, containing 0.28 g. sodium was made. Further stirring and distillation for 1 hour at 85–110° C. yielded about 2 g. more of methyl acetate. The reaction mix was acidulated as in Example XXV, filtered and given a distillation treatment to remove unreacted esters. Yield of product indicated a lower completeness of reaction than was obtained in the reaction of Example XXV, but saponification number of the product indicated about the same degree of replacement. The product had: Gardner color, No. 17; Gardner-Holdt viscosity, Z6–Z7; saponification No. 218, specific viscosity, 0.827.

The results show that in relation to the rate of the desired reaction, the loss of catalyst is more rapid at 110° C. than it is at 60° C., so that more catalyst is required at the higher temperature.

EXAMPLE XXVII

When the same proportions of materials and the same reaction conditions as those described in Example XX were used, with the exception that the temperature of the reaction mixture was held at 80° C., the reaction reached the stage where the polyvinyl ester became soluble in petroleum ether within 25 minutes after the catalyst-ester mixture was added to the polyvinyl acetate. Likewise, the curve for rise in viscosity vs. time, obtained by taking samples during the reaction and determining their viscosity in benzene solution, showed that the reaction at 80° C. was about three times as rapid as the reaction at 60° C. Loss of catalyst was also more rapid than at 60° C.; in relation to the useful reaction, the loss of catalyst was slightly more rapid at 80° C. than at 60° C.

EXAMPLE XXVIII

A suspension of sodium tertiary butoxide in dioxane was prepared as follows: Thoroughly dried and redistilled dioxane, 260 ml., was mixed with 110 ml. of tertiary butanol in a 3-necked flask, equipped with stirrer, reflux condenser, and fractionating column. Eight and three-fourths grams of sodium, in small pieces was added by dropping it through the reflux condenser. The mixture was stirred and boiled under reflux until sodium was no longer visible. The reflux condenser was then removed and the outlet stoppered. The excess of tertiary butanol was then removed by boiling the mixture and taking the vapors off through the fractionating column, until the temperature at the head of the column corresponded with pure dioxane. The quantity of distillate was 133 ml. A suspension of sodium tert. butoxide in dioxane was left in the flask.

A mixture of this catalyst suspension with esters was made by mixing 26.2 g. of the suspension with 80 g. of the soybean methyl esters of the type described in Example XX, in a flask arranged to exclude air, as described in Example XX. Titration of a sample of the mixture showed that its alkalinity was equivalent to 0.007 g. of sodium per ml.

A solution of polyvinyl acetate, AYAC, in dioxane was dried and put into a reaction vessel as described in Example XX. The solution was heated to 80° C., and a portion of the catalyst-ester mixture described above was added, together with an additional quantity of soybean methyl esters, sufficient to make the total mixture have the following composition: Polyvinyl acetate, 20 g.; dioxane 60 g.; soybean methyl esters, 77.5 g.; sodium tert. butoxide, 1.9 g. (equivalent to 0.46 g. sodium).

The mixture was stirred at 80° C. for 90 minutes, then held over night without heating and stirring, and then brought back to 80° C., stirred for 30 minutes, then acidulated with 85% phosphoric acid, in a ratio of 1 mole of $H_3PO_4$ per atom of sodium compound in the mixture. Observations on samples taken during the reaction showed that the polyvinyl ester became soluble in petroleum ether within 40 minutes, and reached maximum viscosity in about 85 minutes. The rate of loss of catalyst was about the same as in Example XXVII; half the alkalinity had disappeared in the first 20 minutes and two-thirds had disappeared in 1 hour at 80° C.

The reaction product after acidulation was filtered on a suction filter with diatomaceous earth as a filter aid. The resulting clear, cherry-red oil was given a distillation treatment as described in Example XX, with a final temperature of 250° C. at 1 mm. pressure. The yield of distillate indicated that half the acetate groups of the polyvinyl acetate had been replaced.

The final product was a light-colored heavy-bodied oil. Specific viscosity in benzene at 25° C., 50 g. per liter of solution: 1.05. Gardner-Holdt viscosity at 25° C.: Higher than Z10. Gardner color: No. 13. Saponification No.: 304.

EXAMPLE XXIX

The process was carried out as in Example XXVIII with the exception that sodium methoxide instead of sodium tertiary butoxide was prepared for use as the catalyst. Replacement of acetate by ester-ester interchange took place, but at a rate about one-third of that in Example XXVIII.

EXAMPLE XXX

In a 1 liter creased flask, equipped with a propeller-type stirrer, two inches in diameter, and arranged for operation with a nitrogen atmosphere, were placed 30 g. (1.3 moles) of sodium and 400 g. of a kerosene fraction distilling at 120 to 190° C. The mixture was heated, under nitrogen, to 115° C., then stirred at 5000 R. P. M. for 12 min. The stirring was then stopped and the mixture was allowed to cool to room temperature. The sodium was finely dispersed and settled slowly to form a white layer at the bottom.

The temperature was lowered to 8° C. by external cooling, and amyl chloride (a fraction distilling from commercial mixed amyl chlorides at 99–104° C.) was added slowly, while the stirrer was operated at 550 R. P. M. In the course of 75 minutes, 55.5 g. (0.52 mole) of amyl chloride was added, while the temperature was kept below 20° C. After the mixture had stood at room temperature overnight, a titration showed that alkalinity corresponding with 1 mole of sodium per mole of amyl chloride had been used up, indicating that all the amyl chloride had reacted with sodium. The mixture was a dark colored suspension.

In a reaction flask as described in Example XX was placed a solution of polyvinyl acetate in dioxane, dried as in example XX, in quantity to contain 20 g. polyvinyl acetate and 99.6 dioxane. To this was added 76.4 g. of a commercial refined winterized cottonseed oil (Wesson oil). The mixture was not homogeneous at 80° C. To this mixture, in a nitrogen atmosphere, was added 21 ml. of the catalyst mixture described above, containing total alkalinity equivalent to 0.67 g. sodium, of which between 50 and 67% was estimated to be in the form of amyl sodium.

Ester interchange took place rapidly at 80° C. Within less than 12 minutes, the mixture had reached the stage of being soluble in petroleum ether; viscosity measurements showed that the reaction practically reached equilibrium in 15 minutes.

EXAMPLE XXXI

A mixture of 20 g. of dried polyvinyl acetate AYAC, 46 g. of tributyrin and 50 g. ethyleneglycol diethyl ether was put into a reaction flask. This mixture was clear and homogeneous at room temperature.

The mixture was heated to 80° C. in an atmosphere of nitrogen and catalyst solution prepared as described in Example XXV was added, in quantity sufficient to contain 0.8 g. of dissolved sodium. The mixture was stirred for 3 hours at 80° C., then held overnight without stirring at 75° C.

After acidulation, the product was dissolved in benzene, washed several times with 40% aqueous acetone, then given a distillation treatment to remove solvent and reaction products other than polyvinyl ester. Final temperature was 248° C. at 1 mm. pressure, sufficiently drastic conditions to remove tributyrin together with any acetates.

The product was a reddish-colored resin, resembling polyvinyl acetate and having a saponification number of 491, showing that a high degree of replacement of acetic by butyric radicals had been obtained. Specific viscosity, 0.81.

EXAMPLE XXXII

A batch of low-viscosity polyvinyl acetate was prepared by heating a mixture of distilled vinyl acetate, 60 g., purified dioxane, 240 g. and tertiary butyl hydroperoxide, 0.087 g., in a closed iron pressure vessel to 180° C., and holding the mixture at 180–185° C. for 1 hour. The resulting solution was heated in a distilling flask to remove solvent and unreacted monomers. Final temperature, 135° C. at 1 mm. pressure. Yield, 88%. The polymer had a specific viscosity of 0.277 in benzene at 25° C., at a concentration of 50 g. per liter of solution, and a saponification number of 549.

A reaction vessel was equipped as described in Example XX with the exception that a receiver chilled with solid carbon dioxide mix was placed between the outlet from the reflux condenser and the vacuum line, so that any material distilled from the reaction vessel could be collected.

Catalyst solution was prepared in the reaction vessel, by mixing in an atmosphere of nitrogen, 0.48 g. sodium, 23.5 g. of purified tetrahydrofuran and 2.0 g. naphthalene. After 1 hour's stirring, 66 g. of soybean methyl esters was added to the mix. The mixture was heated to 60° C., and then a solution of 20 g. of the polyvinyl acetate described above in 40 g. of tetrahydrofuran was added. The mix was stirred for 3 hours at 60° C., at 1 atmosphere pressure. The pressure was then reduced, to distill out tetrahydrofuran and methyl acetate. Distillate amounted to 64.4 g. and contained 6.8 g. methyl acetate.

The mix was then held for 16 hours, without stirring, in a thermostat at 60° C., after which stirring was resumed, and the pressure was reduced to about 2 mm. Distillate amounted to 4.5 g., containing 2.4 g. methyl acetate.

The product was treated with phosphoric acid to break up sodium compounds and filtered. After a distillation treatment to remove unreacted methyl esters, at 240° C. maximum temperature, pressure 1 to ½ mm., the product was a viscous oil with the following characteristics: Color No. 13; Gardner-Holdt viscosity, Z; specific viscosity, 0.38; acid No. 5.7; saponification No. 202; iodine No. 109.

EXAMPLE XXXIII

Polyvinyl acetate with slightly higher viscosity was prepared as follows: 60 g. of distilled vinyl acetate, 140 g. dioxane and 0.36 g. benzoyl peroxide were placed in a 300 ml. flask and heated under reflux for 4 hours at 90–100° C. Solvent and unpolymerized vinyl acetate were removed by heating to 100° C. at 1 mm. pressure. Yield of polymer, 96%; specific viscosity, 0.55; saponification Number 585.

A reaction with soybean methyl esters was carried out as in Example XXXII, with practically identical results. Final product had the following characteristics: Gardner-Holdt viscosity, Z5–Z6; acid No. 3.7; saponification No. 194; iodine No. 114.

EXAMPLE XXXIV

A commercial grade of polyvinyl acetate (AYAF), having a specific viscosity of 7.26 in benzene at 25° C. at a concentration of 50 g. per liter of solution, and a saponification number of 650 was dried and dissolved in tetrahydrofuran.

A reaction was carried out as described in Example XXXII, with the exception that a larger proportion of tetrahydrofuran was used as solvent. The reaction was somewhat less complete than the reactions of Examples XXXII and XXXIII. The final product was a light colored, extremely viscous oil, too viscous to measure on the Gardner-Holdt scale. Specific viscosity, 7.17; Gardner color, 12; acid No. 1.3; saponification No. 267; iodine No. 99.5.

EXAMPLE XXXV

A commercial grade of polyvinyl acetate (AYAT) having a specific viscosity of 9.45, in benzene, 25°, 50 g. per liter and a saponification number of 614 was dissolved in purified dioxane, dried as described in Example XX and put into a reaction flask arranged as described in Example XXIV.

In a separate flask, a solution of sodium in tetrahydrofuran-naphthalene was prepared. Soybean methyl esters were added to this and the tetrahydrofuran was distilled off. To the solution of polyvinyl acetate in the reaction flask were added soybean methyl esters and the catalyst-ester mixture in quantities to make the whole mix contain 20 g. of polyvinyl acetate, 95 g. dioxane, 65 g. soybean methyl esters, 2.4 g. naphthalene and 0.46 g. sodium.

The mixture was very viscous and showed a tendency to wrap around the stirrer shaft, but it was stirred for 3 hours at 60–65° C. 1 atmosphere pressure. The pressure was then reduced gradually during the next hour and 16.9 g. of distillate, containing 5.8 g. methyl acetate was collected.

The mix was then held for 16 hours without stirring, at 57° C., after which the mix was again stirred while the pressure was reduced and 30 g. of distillate was removed, containing 3.2 g. methyl acetate.

The mix was then acidulated by stirring in 1 ml. of 85% H3PO4. The mixture became light orange colored and more fluid than before. Three extractions with 85% acetone were used to remove unreacted monomers. This was done by stirring the product with 250 ml. of 85% acetone, then allowing the mix to settle. After the acetone layer was drawn off, the procedure was repeated twice with 200 ml. portions of 85% acetone. The material extracted by the acetone was found, after removal of the solvent, to weight 15.7 g. and to have a viscosity only slightly higher than soybean methyl esters.

The residue was taken up in petroleum ether, washed with 80% acetone and filtered. After removal of the petroleum ether, the product was given a distillation treatment to remove any remaining volatile material, but very little distillate was obtained at 246°, ½ mm. pressure, indicating that nearly all of the methyl esters were removed by the acetone extractions.

The final product at room temperature seemed almost solid, but it showed true viscous flow, and was soluble in mineral spirits. Gardner color, 11; acid No. 1.1; saponification No. 247; specific viscosity, benzene, 25° C., 50 g. per liter, 11.3.

Drying tests on the products of Examples XXXII, XXXIII, XXXIV, and XXXV showed that increasing viscosity of the polyvinyl acetate used gave increased toughness and hardness of the dried films, but all were vastly superior to soybean oil.

EXAMPLE XXXVI

Reaction in a ketone as solvent

To a dried solution of polyvinyl acetate (AYAC) in purified methyl isobutyl ketone was added a mixture of catalyst and fatty esters prepared by mixing winterized refined cottonseed oil (Wesson oil) with a catalyst solution prepared as described in Example XX and distilling off the tetrahydrofuran under vacuum. The reaction mixture, consisting of 20 g. polyvinyl acetate, 59 g. Wesson oil, 91 g. methyl isobutyl ketone, 0.7 g. sodium and 4.8 naphthalene was stirred for 90 minutes at 80° C., 1 atm. pressure, after which the pressure was reduced to distill off the solvent and the catalyst was neutralized by addition of 2 g. acetic acid.

After two extractions with 3 volumes of ethanol to remove glycerides and a third extraction with 75% aqueous ethanol, the dried, solvent-free product was a viscous reddish oil, saponification No. 282; acid No. 1.5; Gardner viscosity Z10; Gardner color 16. Observations made on samples taken during the reaction indicated that the reaction was rapid and that a smaller proportion of catalyst would have been sufficient.

A reaction in isophorone instead of methyl isobutyl ketone proceeded at about the same rate under the same conditions to yield a similar product.

EXAMPLE XXXVII

The process of Example XXXVI was repeated with the exception that aniline was employed as a reaction medium rather than methyl isobutyl ketone. A rapid reaction took place to yield a product analogous to that contained in Example XXXVI.

EXAMPLE XXXVIII

Polyvinyl acetate (AYAC) was dissolved in three times its weight of toluene, and the solution was boiled in a flask equipped with a reflux condenser arranged in such a way that any moisture condensed with the toluene vapors was caught in a trap and did not return to the flask. Boiling was continued until no more moisture was evolved.

In a reaction flask as described in Example XX, was put 40 g. tetrahydrofuran, 4.5 g. naphthalene and 0.8 g. sodium. Air in the flask was replaced by nitrogen, and the mixture was stirred for 80 minutes. A dark green solution was formed and nearly all of the sodium dissolved.

To this mixture was added 77.5 g. of distilled methyl esters of soybean oil, prepared as in Example XX. The pressure was reduced to 15 mm. and the temperature was raised to 60° C. to distill off the tetrahydrofuran. With the mixture at 50° C., a portion of the dried solution of polyvinyl acetate in toluene was added, in quantity such that the composition of the mixture was: Polyvinyl acetate, 20 g. (0.23 equivalent); toluene, 58.6 g.; soybean methyl esters, 77.5 g. (0.27 equivalent); naphthalene, 4.5 g.; sodium, 0.8 g. The mixture was stirred and heated to 80° C.; stirring at this temperature was continued for 90 minutes, after which the catalyst was neutralized by the addition of 2 ml. of concentrated aqueous HCl.

Observations on samples taken during the reaction showed that the mixture was a clear dark red solution as soon as it reached 80° C., but that the reaction was somewhat slower than the reaction in Example XXVII, in spite of the higher concentration of catalyst.

The acidulated product was filtered with suction then heated in a distilling flask, with steam bubbling through the charge, to distill out solvent, napthalene and unreacted methyl esters. Final temperature, 267° C., at 1 mm. pressure. The product was a heavy-bodied oil: Acid No. 3.0; saponification No. 268; Gardner-Holt viscosity, higher than Z10; Gardner color 16. The saponification number of the product indicates that about 54% of the acetate had been replaced, so that the reaction must have proceeded very nearly to equilibrium.

When the reaction was run in toluene as in Example XXXVIII but with the proportion of catalyst used in Example XXVII, the initial rate of reaction was less than half as great as it was in Example XXVII, and the reaction came to a standstill before it was half-way to equilibrium, because the concentration of catalyst became too small to be effective.

EXAMPLE XXXIX

When a reaction was carried out with the same ingredients and conditions as Example XXX, with the exception that toluene (102 g.) was used in place of dioxane as solvent, the reaction took place rapidly, but at a rate about one-third as great as that observed in Example XXX. The product also was somewhat darker colored than that of Example XXX.

EXAMPLE XL

The process of Example XVI was repeated with the exception that toluene was employed as a solvent and reaction medium. During the course of the reaction together with a small amount of period of about 47 minutes at a temperature within the range of 104–122° C. Catalyst in an amount equal to about 0.57% of the weight of the reaction mixture was added at the beginning of the reaction together with a small amount of methanol. The product obtained was a mixed ester containing both acetate and soybean oil acid groups.

EXAMPLE XLI

In a 3-necked reaction flask, equipped with thermometer, stirrer and a reflux condenser, was placed a mixture of polyvinyl acetate and methyl phenylacetate in the equivalent ratio of 1:1.5. To this mixture was added 1% of sodium hydride, which had been finely ground in a hydrocarbon medium. The mixture was stirred for 30 min. at 70–80° C., 1 atm. pressure. After neutralization of the catalyst with phosphoric acid, filtration, and a distillation treatment under vacuum to remove the excess of methyl phenyl acetate, the product was a hard, brittle, light-colored thermoplastic resin consisting of a mixed ester of polyvinyl alcohol with acetic and phenyl acetic acids.

EXAMPLE XLII

In a 3-necked reaction flask, equipped with a thermometer, a stirrer and an air cooled condenser fitted with a water cooled refluxing still head was placed one equivalent weight of each of methyl anisate and polyvinyl acetate. The methyl anisate is a good solvent for the polyvinyl acetate and no additional solvent medium was necessary. A promoter in the form of Cellosolve acetate in an amount equal to about 1.5 equivalents thereof together with an amount of sodium hydride catalyst equal to about 1% of the total weight of the reaction mixture was then added. The reaction proceeded and the product obtained was a hard, brittle thermoplastic resin.

EXAMPLE XLIII

*Preparation of polyvinyl benzoic ester by reaction of polyvinyl acetate and methyl benzoate in presence of methoxyethyl acetate as promoter and metallic sodium as catalyst*

A suspension of very finely divided metallic sodium in toluene was prepared in a 1 liter flask, having creased sides to increase the mixing action of the stirrer, and equipped with a propeller-type stirrer, with blades having a radius of 1 inch. A mixture of 360 g. toluene and 30 g. sodium metal was heated to 115° C., with air excluded from the flask, and stirred for 6 min. at 550 R. P. M., 4 min. at 1550 R. P. M. and 12 min. at 5000 R. P. M., the temperature being held at 109–115° C. The mix was then allowed to cool without stirring.

Into a reaction vessel equipped as described in Example XXIV were placed 20 g. (0.23 equivalent) of polyvinyl acetate AYAC, 31 g. methyl benzoate (0.23 equivalent) and 30 g. (0.25 equivalent) methoxyethyl acetate. The mixture was heated under reduced pressure, and any moisture present was distilled off through the fractionating column, followed by a small proportion of the methoxyethyl acetate. With the reaction mixture at 75° C., a portion of the catalyst suspension of finely divided sodium was added, in quantity sufficient to contain 0.38 part sodium per 100 parts of the reaction mixture. The mixture was heated and stirred for 2.5 hours at 75–80° C., with the pressure gradually reduced to 3 mm. of Hg. During that time, 36 g. of distillate was collected, consisting of methyl acetate and methoxyethyl acetate, together with a small quantity of toluene, introduced with the catalyst. The reaction was stopped by the addition of 0.85 ml. of acetic acid followed by 0.85 ml. of 85% $H_3PO_4$.

The product was dissolved in 100 ml. benzene, filtered, washed three times with water, then heated under reduced pressure to distill off solvent and any remaining methyl benzoate and methoxyethyl benzoate. The product remaining was a hard brittle thermoplastic resin, much harder than polyvinyl acetate. It has a saponification number of 460, indicating that 55% of the acetate groups in the polyvinyl acetate had been replaced by benzoate groups. It was soluble in benzene, acetone and dimethylphthalate, but insoluble in mineral spirits and cottonseed oil. A solution of the resin in a small proportion of acetone could be drawn out into fine fibers or could be blown like soap bubbles to form highly iridescent films.

Polyvinyl ester of furoic acid was made by a similar procedure and was like the polyvinyl benzoate in properties, except that it was even harder.

EXAMPLE XLIV

*Reaction between polyvinyl acetate and dimethyl succinate, with metallic sodium as catalyst*

Into a reaction vessel equipped as described in Example XXIV were placed 20 g. (0.23 equivalent) of polyvinyl acetate (AYAC), 8.35 g. (0.11 equivalent) of dimethyl succinate, 13.5 g. (0.11 equivalent) of methoxyethyl acetate, and 62.7 g. dioxane. The mixture was dried by distilling off 7.3 g. of dioxane through the fractionating column. With the mixture at 54°, and air excluded, catalyst suspension, made as described in Example XLIII was added in quantity sufficient to give 0.3 part of metallic sodium per 100 parts of reaction mix. The temperature rose about 10°, and a titration showed that most of the alkalinity had disappeared. An additional 0.24% of sodium was added, with the mix at 62° C. The viscosity of the mixture increased rapidly. Within 20 minutes the mixture had become viscous enough to wrap around the shaft of the stirrer, and within 5 minutes more it had set to a short-textured jelly.

The jellied mixture was removed from the flask and mixed in a mortar with 1 ml. of glacial acetic acid, to neutralize the catalyst. The mixture was then placed in a flask and stirred for 1½ hours with 300 ml. of ethanol, to remove solvent and unreacted esters from the cross-linked polymeric ester. After settling and removal of the alcohol layer, the procedure was repeated, after which the product was spread out on paper and allowed to dry in the air for several days. The product is a tough, hard, light-colored resin which swells and softens, but does not dissolve, in benzene. It is infusible, but softens to some extent and becomes rubbery when heated.

A product made similarly with dimethyl adipate instead of dimethyl succinate was similar in properties except that it was more rubbery and not as hard at ordinary temperatures.

EXAMPLE XLV

*Polyvinyl ester from partially hydrogenated sardine oil*

A moisture-free mixture of polyvinyl acetate, AYAC, 39.8 g., dioxane, 95 g., tetrahydrofuran, 270 g., and partially hydrogenated sardine oil, 280 g., was prepared in a reaction flask with air excluded. The partially hydrogenated sardine oil was a grainy mixture of oil and solid fat at room temperature. It had the following characteristics: Iodine No. 123; saponification No. 192; acid No. 0.3; capillary melting point 66° C.; cloud point, 40° C.

To the reaction mixture at 60° C. was added a catalyst solution containing tetrahydrofuran, 34 g.; naphthalene 6.8 g.; sodium 1.22 g. The mixture was stirred for 2.2 hours at 60° C. and 1 atmosphere pressure. The pressure was then reduced to cause distillation of solvent from the mixture, and the temperature was raised to 90° C. over a period of 1.4 hours. Glacial acetic acid, 3.1 g. was then added to stop the action of the catalyst.

The product was stirred thoroughly with three times its weight of anhydrous ethanol and settled. After removal of the alcohol layer, the extraction with ethanol was twice repeated. The product was then heated to 190° C. at a pressure of 15 mm. of Hg, to remove solvent. The product was a clear viscous oil; Gardner-Holdt viscosity Z-7; saponification No. 232. The oil could not be induced to cloud or crystallize by chilling to −70° C., nor by chilling to this temperature and then holding at −15° C. for several days. The low melting point is remarkable in view of the high melting point of the partially hydrogenated sardine oil, the fatty acids of which are estimated to contain more than 25 percent of saturated fatty acids.

The product was soluble in mineral spirits, and dried to a tough clear film of good quality when a solution of the oil in mineral spirits containing added cobalt drier was spread on glass. In contrast, the partially hydrogenated sardine oil gave a cloudy, grainy film under the same conditions, which remained soft and smeary, completely unsuitable for use as a drying oil.

The following table sets forth comparative drying tests for the product of Example XLV.

TABLE V

Oil dissolved in mineral spirits containing cobalt naphthenate drier to give 0.05% cobalt. Film spread on glass with doctor blade, opening 0.002 inch, and allowed to dry in horizontal position.

|  | Product of Example XLV | Partially hydrogenated sardine oil |
|---|---|---|
| Time to set to touch | 90 min | More than 12 days. |
| Tack-free | 5 hours | Do. |
| Hardness by Sward Rocker, Seconds to come to full stop. After 12 days. | 13 sec | Rocker cuts through film. |
| Condition of film after 12 days | Clear, smooth, tack-free colorless film. Very tough. | Grainy, smeary, somewhat sticky. Completely unsatisfactory. |

Additional characteristics of product of Example XLV:

Iodine number—106
Gelation time, in Brown heat test—8 min., 40 sec.
Gelation time of a sample of tung oil, for comparison—8 min., 15 sec.

EXAMPLE XLVI

*Copolymerization of vinyl acetate and allyl acetate. Reaction of product with soybean esters*

A solution of 50 g. vinyl acetate, 25 g. allyl acetate and 0.3 g. tertiary butyl hydroperoxide in 250 g. purified dioxane was heated under pressure to 157° C. and held at that temperature for 1.25 hours. The cooled and filtered product was heated to 145° C. at 15 mm. pressure to remove solvent and unreacted monomers. Yield of polymer, 27.3%; saponification No. 575; acid No. 5.0; specific viscosity in benzene, 50 g. per liter of solution, 25° C., 0.256.

Of the co-polymer, 12.5 g. (0.127 equiv.) was dissolved in 32 g. of dry tetrahydrofuran together with 45.7 g. (0.159 equiv.) of distilled methyl esters of soybean oil. Catalyst made as described in Example XXI was added to the mixture, in quantity sufficient to give 0.29% of sodium in the mixture. After 1 hour, with the mixture at 70° C., another portion of catalyst, half as large as the first, was added. The mix was then heated for 1 hour at 70°, followed by 30 min. at 70 to 99° C. During the last 45 minutes, the pressure was reduced to remove solvent and methyl acetate by distillation. After neutralization of the catalyst with acetic acid, the product was washed twice with 3 volumes of anhydrous ethanol and once with 3 volumes of 75% aqueous ethanol. The dried solvent-free product was a viscous oil. Gardner viscosity, Z-2.

Drying properties of the product resembled those of corresponding products made with polyvinyl acetate.

EXAMPLE XLVII

*Copolymerization of vinyl acetate with vinyl 2-methoxy ethyl ether. Ester interchange of product with soybean methyl esters*

A mixture of 60 g. vinyl acetate, 15 g. of vinyl 2-methoxy ethyl ether and 0.3 g. tertiary butyl hydroperoxide, dissolved in 250 g. dioxane, was heated under pressure to 150° C. and held there for 1 hour. After cooling and filtering, the mixture was heated to 136° C. at 15 mm. pressure to remove solvent and unreacted monomers. Yield, 76%. The product was a clear light-colored soft resin. Saponification No. 537. Acid No. 1.0. Specific viscosity in benzene, 50 g. per liter of solution, 25° C., 0.39.

A mixture of 23.8 g. of the copolymer, 82.1 g. of distilled methyl esters of soybean oil and 70 g. tetrahydrofuran was heated to 70° C. and treated with catalyst, made as in Example XXI, containing sodium equivalent to 0.3% of the weight of the mixture. The mixture was held at 70° C. and 1 atm. pressure for 45 min., then for 1 hour longer with the pressure gradually reduced to 15 mm. of Hg, and the temperature gradually raised to 95° C., to distill off solvent and methyl acetate.

After neutralization of the catalyst and extraction with ethanol as in Example XLVI, the product was a red viscous oil. Saponification No. 213; acid No. 1.2, Gardner viscosity Z-4.

Drying properties of the product resembled those of corresponding products made with polyvinyl acetate.

EXAMPLE XLVIII

*Metallic sodium as catalyst for reaction of soybean methyl esters and polyvinyl acetate*

Into a 4-necked reaction flask, equipped with stirrer, thermometer and sampling tube, and with its outlet connected to a condenser and receiver chilled with dry ice mixture, was placed a solution of 20.2 g. polyvinyl acetate, AYAC, in 65 g. of methoxy ethyl acetate. A portion of the methoxy ethyl acetate was distilled off to ensure dryness of the mixture. Seventy-two grams of distilled methyl esters of soybean fatty acids, prepared by methanolysis of soybean oil, were then added.

To the mixture at 65° C. was added a suspension of sodium in toluene, prepared as in Example XLII in quantity sufficient to give 0.15% sodium in the mixture. The sodium seemed to dissolve rapidly. The mixture was stirred at 65 to 78° C. for 25 minutes, with pressure reduced gradually to 55 mm. An additional quantity of catalyst, to give 0.1% additional sodium was added and the mixture was stirred for 1 hour 20 min. at 78-80°, with the pressure gradually reduced to 3 mm. of Hg. Finally the temperature was raised to 96° and held there for 20 min. after which 1.3 ml. of 85% phosphoric acid was added to neutralize the catalyst. The distillate consisted of a mixture of methyl acetate and methoxy ethyl acetate together with the toluene introduced with the catalyst.

The product in the flask was extracted three times by stirring with 250 ml. of hot absolute ethanol, then allowing it to cool and settle at room temperature and drawing off the ethanol layer. The residue was then dissolved in petroleum ether and washed with water. After removal of solvent by heating the solution gradually to 155° C. at 15 mm. pressure, the product was a clear viscous oil, Gardner color 14; viscosity Z-6, saponification No. 226; acid No. 1.2.

Table VI sets forth comparative drying properties of the product of this example and soybean oil whereas Table VII sets forth comparative drying properties of the product of this example compounded with 25% ester gum and soybean oil compounded with 25% ester gum.

Oil dissolved in equal weight of mineral spirits containing cobalt naphthenate to give 0.05 part cobalt in the mixture. Film spread on glass with doctor blade, opening 0.002 inch, and allowed to dry in horizontal position at room temperature.

TABLE VI

|  | Product of Example XLVIII | Soybean Oil |
|---|---|---|
| Time to set to touch | 47 min | About 12 hours. |
| Tack-free | 122 min | Stays tacky indefinitely. |
| Hardness by Sward Rocker, Time to come to full stop: |  |  |
| After 24 hours | 14 sec | 5 sec. |
| After 1 week | 21 sec | 1 sec. |
| After 2 months | 12 sec | 1 sec. (Rocker cuts film). |
| Condition of film after 2 months | Clear colorless film. Very smooth and tough. Cannot be marred by thumb-nail. | Very soft. Sticky. Part of film comes away with finger. |

TABLE VII

|  | Product of Ex. XLVIII (3 parts), Ester gum (1 part) | Soybean Oil (3 parts), Ester gum (1 part) |
|---|---|---|
| Time to set to touch | 190 min | About 12 hours. |
| Tack-free | 210 min | About 1 week, but tackiness returns. |
| Hardness by Sward Rocker. Time to come to full stop: |  |  |
| After 24 hours | 66 sec | 9 sec. |
| After 1 week | 115 sec | 20 sec. |
| After 2 months | 110 sec | 12 sec. |
| Condition of film after 2 months | Clear colorless film. Very smooth and tough. Cannot be marred by thumb-nail. | Slightly tacky. Soft enough to take fingerprint. |

EXAMPLE XLIX

*Reaction of polyvinyl ester of lard fatty acids with dimethyl phthalate*

Polyvinyl ester of lard fatty acids prepared as described in Example XXII was mixed with dimethyl phthalate and tetrahydrofuran. To the mixture was added a catalyst solution prepared as described in Example XX, in quantity such that the mixture contained 36 g. polyvinyl ester of lard fatty acids, 16 g. dimethyl phthalate, 69 g. tetrahydrofuran, 0.5 g. sodium and 3 g. naphthalene. The mixture was stirred at 60–65° C. for 140 minutes at 1 atm. pressure, after which the pressure was reduced to cause distillation of solvent from the mix. After distillation has proceeded for 10 minutes, the mixture became very viscous. Acetic acid, 1.0 ml., was added to neutralize the catalyst remaining, and distillation of tetrahydrofuran was continued.

The product was mixed with three times its weight of anhydrous ethanol and stirred vigorously for 45 min. at 70° C., then allowed to cool and settle. After removal of the alcohol layer the procedure was repeated, omitting the heating. After a third extraction, with aqueous ethanol, and removal of residual solvent, the product was found to be a tough, transparent, rubbery material. It would retract after being stretched but did so more slowly than rubber. It had a very tacky feel. Surprisingly, in view of these properties, it was soluble in benzene and in mineral spirits. Specific viscosity in benzene at 25° C., 50 g. per liter of solution, 1.9, in comparison with 0.9 for the polyvinyl ester used in the reaction. Saponification No. 283; Gardner color 17. A solution in mineral spirits with added drier dried rapidly when spread on glass to a clear colorless film. The dried film was not as tough and hard as a film of polyvinyl soybean ester, but was at least equal to a film made from linseed oil.

Of particular interest among the products of this invention are those polyvinyl esters in which the proportion of fatty acid radicals derived from normally solid higher fatty acids with respect to the fatty acid radicals derived from normally liquid higher fatty acids is higher than the ratio of such radicals in most conventional natural drying oils.

It has been discovered that the polyvinyl esters in which at least 25% of the hydroxyl groups are esterified by higher fatty acids and in which not more than about 70% of the higher fatty acid radicals of the polyvinyl ester are derived from higher fatty acids normally solid at temperatures of 40° C. and below, are oils which do not crystallize, even when cooled to temperatures much lower than those at which the glyceride oils containing the same fatty acids crystallize spontaneously. Members of this class of derivatives containing 40% of solid fatty acids could not be induced to crystallize or cloud under any circumstances, including chilling to minus 70° C. and long storage at minus 18° C. Preferably, these mixed esters contain from about 15 to about 40% higher fatty acid radicals derived from solid fatty acids.

This is truly an unusual and unexpected phenomenon. As a result, it is possible through the expedient of this invention to produce for the first time directly from natural oils unsuitable for such purposes, a plurality of synthetic oils which can be used in the compounding of coating compositions as lubricant additives, as drying oils, as chewing gum bases, and for innumerable other purposes.

It is generally recognized by those skilled in the art that natural animal and vegetable oils in which more than about 15% of fatty acid radicals are derived from fatty acids which are normally solid at temperatures of 40° C. and below are unsuitable for use as drying oils, for the compounding of coating compositions, as mineral oil additives, and the like for the reason that these products tend to cloud and crystallize in whole or in part upon cooling or drying. Various attempts, such as winterizing, have been made to overcome this deficiency of the natural animal and vegetable oils. Prior to this invention, no economically feasible process has been developed for the large scale utilization of many oils which contain a high proportion of normally solid fatty acid radicals.

The significance of this phenomenon of the aforementioned products of this invention is truly appreciated when it is realized that by virtue thereof low priced and previously undesirable materials such as fish oils may simply and economically be converted to extremely useful synthetic drying oils. Of particular interest in this respect are Examples XXI and XLV which are directed to the polyvinyl esters derived respectively from lard and sardine oil. In Table VIII there is set forth an enumeration of several natural animal and vegetable oils which are generally unsuitable for use in coating compositions but which by the process of this invention may be converted into extremely valuable materials. The relative percentage of saturated to unsaturated fatty acid radicals in each of these oils is likewise set forth in the table.

TABLE VIII

| | Per cent higher fatty acid radicals derived from saturated acids |
|---|---|
| Peanut oil | 18.0 |
| Cottonseed oil | 27.2 |
| Cod liver oil | 14.8 |
| Herring oil | 20.3 |
| Menhaden oil | 24.2 |
| Sardine oil (Pilchard) | 22.9 |
| Sardine oil (Japanese) | 17.8 |
| Whale oil | 27.9 |
| Palm oil | 47.0 |
| Shea butter | 46.7 |
| Lard | 40.0 |

It is significant that this phenomenon attends polyvinyl esters prepared in accordance with this invention from starting materials, such as polyvinyl acetate which are resins, not oils, when no more than about 25% of the low molecular weight acid radicals are replaced by higher fatty acid radicals. The expression higher fatty acid is employed herein in its commonly understood connotation. Generally fatty acids having ten or more carbon atoms per molecule are so classified.

It is likewise significant that by virtue of the process of this invention synthetic oils may be tailor-made to serve any desired function. Thus, there may be substituted in the polyvinyl molecule any desired combination of acid radicals so that the ultimate product obtained will demonstrate essentially any desired physical properties. Such a result may be achieved for example by reacting polyvinyl acetate with a mixture of natural oils such as lard oil and linseed oil.

Many of the products of this invention and particularly those derived from polybasic acids demonstrate an elastomeric property. These derivatives tend to return to their original configuration when stretched or otherwise physically distorted. With respect to these polybasic acid derivatives of polyvinyl alcohol it is pointed out that these materials may be drawn into filaments which demonstrate substantial tensile strength. Likewise, these materials may be subjected to a process of molecular orientation whereby the strength and uniformity of the filament, so produced may be enhanced.

This application is a continuation-in-part of abandoned application Serial No. 37,514, filed July 8, 1948, entitled Polyvinyl Esters and Ester Interchange Process for the Production Thereof.

The foregoing examples and other portions of this specification are merely illustrative of the invention and are not to be construed in the limitation thereof. The invention is limited solely by the subjoined claims.

What I claim is:

1. A process for the production of polyvinyl esters of fatty acids which comprises reacting at a temperature not greater than about 120° C. in the presence of a catalyst and a reaction promoter, a polyvinyl alcohol ester of a fatty acid and a primary aliphatic alcohol ester of a fatty acid, the acid radical of the aliphatic alcohol ester being derived from a fatty acid of a higher molecular weight than the acid radical of the polyvinyl alcohol ester, said polyvinyl alcohol and aliphatic alcohol esters producing by ester interchange a by-product ester volatilizable under the reaction conditions; and removing a portion of the said by-product ester during the course of the reaction, said reaction promoter consisting essentially of a low molecular weight fatty acid ester of an aliphatic alcohol.

2. A process according to claim 1 in which the reaction is effected at a temperature within the range of between about 40° C. and 80° C.

3. A process according to claim 1 in which the reaction is effected at an initial pressure of about 1 atmosphere and a final pressure of from about zero to about 1 atmosphere.

4. A process according to claim 1 in which the fatty acid radicals of the polyvinyl ester reactant and the aliphatic alcohol ester promoter are the same.

5. A process according to claim 1 in which the catalyst is sodium hydride.

6. A process according to claim 1 in which a mixture of fatty acid esters of aliphatic alcohols is employed as a reactant.

7. A process according to claim 1 in which a mixture of fatty acid esters of aliphatic alcohols is employed as a reactant and in which the reaction is effected at a temperature within the range of from about 40° C. to about 80° C.

8. A process according to claim 1 in which the reactant comprising an aliphatic alcohol ester of a fatty acid is an ester of a drying oil acid.

9. A process according to claim 1 in which a methyl ester of a fatty acid is employed.

10. A process according to claim 1 in which the promoter is an acetate.

11. A process according to claim 1 in which the polyvinyl alcohol ester reactant is polyvinyl acetate.

12. A process according to claim 11 in which the promoter is an acetate.

13. A process according to claim 11 in which the reaction is effected at a temperature within the range of from about 40° C. to about 80° C.

14. A process according to claim 11 in which the reaction is effected at an initial pressure of about 1 atmosphere and a final pressure of from about zero to 1 atmosphere.

15. A process for the production of drying oil fatty acid esters of polyvinyl alcohol which comprises reacting in substantially homogeneous liquid-phase at a temperature not greater than about 120° C. in the presence of a catalyst and an acetate of low molecular weight aliphatic alcohol, a polyvinyl acetate and a low molecular weight primary monohydric alcohol ester of a drying oil fatty acid, said polyvinyl acetate and drying oil fatty acid ester reacting by ester interchange to produce a by-product acetate, and removing during the course of the reaction a portion of said by-product acetate, said acetate of a low molecular weight aliphatic alcohol functioning as a reaction promoter and as a mutual solvent for the reactants.

16. A process for the production of synthetic drying oils which comprises reacting at a temperature not greater than about 120° C. in the presence of a catalyst and a low molecular weight aliphatic alcohol ester of a low molecular weight saturated fatty acid, a polyvinyl ester of a low molecular weight saturated fatty acid, a mixture comprising essentially primary alcohol esters of drying and semi-drying oil fatty acids and an ester of a low molecular weight unsaturated fatty acid, said reactants forming by ester interchange a by-product ester volatilizable under the reaction conditions, and removing a portion of the by-product ester during the course of the reaction, said low molecular weight aliphatic alcohol ester of a low molecular weight saturated fatty acid functioning as a promoter for the reaction and as a mutual solvent for the reactants.

17. A process for the production of polyvinyl esters of fatty acids which comprises reacting at a temperature not greater than about 120° C. in the presence of an ester-ester interchange catalyst and a reaction promoter, a polyvinyl alcohol ester of a fatty acid and a primary aliphatic alcohol ester of a fatty acid, the acid radical of the aliphatic alcohol ester being derived from a fatty acid of a higher molecular weight than the acid radical of the polyvinyl alcohol ester, said reaction promoter consisting essentially of a low molecular weight fatty acid ester of an aliphatic alcohol.

18. The process of claim 17 in which the promoter contains the following molecular structure:

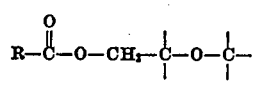

in which

is the acyl radical of a low molecular weight carboxylic acid, in which the undesignated linkages of the carbon atom beta to the acyl group are satisfied by a member of the group consisting of hydrogen, alkyl radicals and aryl radicals, in which the remaining unsatisfied valence bonds are satisfied by any organic radical, and in which the oxygen atom linked to said beta carbon atom forms a part of a radical selected from the group consisting of the ether radicals and the ester radicals.

19. The process of claim 17 wherein the promoter is a low molecular weight organic acid ester of a saturated primary alcohol.

20. The process which comprises essentially reacting at a temperature not greater than about 120° C. in the presence of a solvent and an ester-ester interchange catalyst for the reaction an initial polyvinyl ester and a primary alcohol ester of an organic acid different from the acid from which the polyvinyl ester is derived.

21. The process of claim 20 wherein the ester reacted with the initial polyvinyl ester contains the following molecular structure:

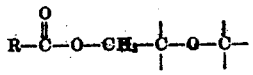

in which

is the acyl radical of a low molecular weight carboxylic acid, in which the undesignated linkages of the carbon atom beta to the acyl group are satisfied by a member of the group consisting of hydrogen, alkyl radicals and aryl radicals, in which the remaining unsatisfied valence groups are satisfied by any organic radical, and in which the oxygen atom linked to said beta carbon atom forms a part of a radical selected from the group consisting of the ether radicals and the ester radicals.

22. The process of claim 20 in which the ester reacted with the initial polyvinyl ester is an ester of a higher fatty acid.

23. The process of claim 20 in which the ester reacted with the initial polyvinyl ester is a natural oil.

24. The process of claim 20 in which the ester reacted with the initial polyvinyl ester is an ester of a natural oil acid.

25. The process of claim 20 effected at a temperature of from about 40° C. to about 100° C.

26. The process of claim 20 in which the initial polyvinyl ester is polyvinyl acetate.

27. The process of claim 20 in which a promoter is employed, said promoter being a low molecular weight fatty acid ester of the low molecular weight aliphatic alcohol.

28. The process of claim 20 wherein a promoter is employed, said promoter having the structure defined in claim 18.

29. The process of claim 20 in which the catalyst is selected from the group consisting of the finely divided alkali metals, alkali metal hydrides and the alkali metal derivatives of hydrocarbons which contain alkali metal atoms bonded directly to carbon atoms.

30. The process of claim 29 in which the catalyst is sodium hydride.

31. The process of claim 29 in which the catalyst is sodium naphthalene.

32. The process of claim 29 in which the catalyst is finely divided sodium.

33. The process which comprises reacting in an organic medium containing organic compounds having unshared electron pairs in the presence of an ester-ester interchange catalyst at a temperature not greater than about 120° C. a polyvinyl ester and a primary alcohol ester of an organic acid different from that from which the polyvinyl ester was derived.

34. The process of claim 33 in which the organic medium is a ketone.

35. The process of claim 33 in which the organic medium is an ether.

36. The process of claim 35 in which the ether is selected from the group consisting of dioxane, tetrahydrofuran, 2-methyltetrahydrofuran, tetrahydrofurfuryl methyl ether, dimethoxyethane, diethoxyethane, diethylene glycol diethyl ether, methylal, ethylene glycol methyl ether acetal, anisole, phenetol, dimethoxy tetraethyleneglycol.

37. The process for the production of polyvinyl esters which comprises reacting at a temperature not greater than about 120° C. in the presence of a solvent and an ester-ester interchange catalyst, a polyvinyl alcohol ester and a primary aliphatic alcohol ester of an organic acid different from the acid from which the polyvinyl ester is derived, and extracting the product so obtained by treatment of the reaction mixture with a material which is a solvent for the unreacted primary alcohol esters but a non-solvent for the product.

38. The process of claim 20, wherein the ester reacted with the initial polyvinyl ester is a methyl ester of a higher fatty acid.

39. The process of claim 20, wherein the ester reacted with the initial polyvinyl ester is an ester of a soybean oil acid.

40. The process of claim 20, wherein the ester reacted with the initial polyvinyl ester is an ester of a linseed oil acid.

41. The process of claim 20, wherein the ester reacted with the initial polyvinyl ester is an ester of a lard acid.

42. The process of claim 20, wherein the ester reacted with the initial polyvinyl ester is an ester of a partially hydrogenated fish oil acid.

43. The process of claim 20, wherein the solvent and the ester reacted with the initial polyvinyl ester are the same.

EDDY W. ECKEY.

REFERENCES CITED

The following references are of record in the file of this patent:

UNITED STATES PATENTS

| Number | Name | Date |
|---|---|---|
| 1,672,157 | Hermann et al. | June 5, 1928 |
| 2,378,827 | Bradley | June 19, 1945 |